US009010097B2

(12) United States Patent
Inoue et al.

(10) Patent No.: US 9,010,097 B2
(45) Date of Patent: *Apr. 21, 2015

(54) EXHAUST PURIFICATION SYSTEM OF INTERNAL COMBUSTION ENGINE

(75) Inventors: Mikio Inoue, Susono (JP); Kohei Yoshida, Gotenba (JP); Yuki Bisaiji, Mishima (JP); Kazuhiro Umemoto, Susono (JP); Masahide Iida, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/262,001

(22) PCT Filed: Mar. 17, 2011

(86) PCT No.: PCT/JP2011/057264
§ 371 (c)(1),
(2), (4) Date: Oct. 19, 2011

(87) PCT Pub. No.: WO2012/124173
PCT Pub. Date: Sep. 20, 2012

(65) Prior Publication Data
US 2014/0010718 A1 Jan. 9, 2014

(51) Int. Cl.
*F01N 3/10* (2006.01)
*F01N 3/00* (2006.01)
(Continued)

(52) U.S. Cl.
CPC .......... *B01D 53/9431* (2013.01); *F02D 41/405* (2013.01); *Y02T 10/44* (2013.01); *F01N 3/206* (2013.01); *F01N 3/208* (2013.01); *F02B 37/00* (2013.01); *F01N 3/0231* (2013.01);
(Continued)

(58) Field of Classification Search
None
See application file for complete search history.

(56) References Cited

U.S. PATENT DOCUMENTS 5,052,178 A 10/1991 Clerc et al.
5,057,483 A 10/1991 Wan
(Continued)

FOREIGN PATENT DOCUMENTS

CN 101454081 A 6/2009
CN 101600860 A 12/2009
(Continued)

OTHER PUBLICATIONS

Aug. 13, 2013 International Preliminary Report on Patentability issued in International Patent Application No. PCT/JP2011/053429 (with translation).
(Continued)

*Primary Examiner* — Walter D Griffin
*Assistant Examiner* — Jelitza Perez
(74) *Attorney, Agent, or Firm* — Oliff PLC

(57) ABSTRACT

In an internal combustion engine, inside of an engine exhaust passage, a hydrocarbon feed valve (16), an exhaust purification catalyst (13), a particulate filter (14), and an $NO_2$ reduction catalyst (15) are arranged. At the time of engine operation, the amplitude of change of the concentration of hydrocarbons which flow into the exhaust purification catalyst (13) is made to become within a predetermined range of amplitude by control of the injection amount of hydrocarbons from the hydrocarbon feed valve (16). When the $NO_2$ which is produced at the particulate filter (14) should be reduced to NO, the injection amount of hydrocarbons is increased whereby the pass through amount of hydrocarbons which pass straight through the exhaust purification catalyst (13) is increased.

11 Claims, 22 Drawing Sheets

(51) Int. Cl.
*F01N 9/00* (2006.01)
*B01D 53/94* (2006.01)
*F02D 41/40* (2006.01)
*F01N 3/20* (2006.01)
*F01N 3/023* (2006.01)
*F02D 41/02* (2006.01)
*F01N 13/00* (2010.01)
*F02B 37/00* (2006.01)

(52) U.S. Cl.
CPC ......... *F01N2610/02* (2013.01); *F02D 41/0235* (2013.01); *F01N 13/009* (2014.06)

(56) References Cited

U.S. PATENT DOCUMENTS

| | | | |
|---|---|---|---|
| 5,075,274 | A | 12/1991 | Kiyohide et al. |
| 5,402,641 | A | 4/1995 | Katoh et al. |
| 5,882,607 | A | 3/1999 | Miyadera et al. |
| 6,109,024 | A | 8/2000 | Kinugasa et al. |
| 6,327,851 | B1 | 12/2001 | Bouchez et al. |
| 6,413,483 | B1 | 7/2002 | Brisley et al. |
| 6,477,834 | B1 | 11/2002 | Asanuma et al. |
| 6,667,018 | B2 | 12/2003 | Noda et al. |
| 6,813,882 | B2 | 11/2004 | Hepburn et al. |
| 6,854,264 | B2 | 2/2005 | Elwart et al. |
| 6,877,311 | B2 | 4/2005 | Uchida |
| 6,983,589 | B2 | 1/2006 | Lewis et al. |
| 7,063,642 | B1 | 6/2006 | Hu et al. |
| 7,073,325 | B2 | 7/2006 | Nakatani et al. |
| 7,082,753 | B2 | 8/2006 | Dalla Betta et al. |
| 7,111,456 | B2 | 9/2006 | Yoshida et al. |
| 7,137,379 | B2 | 11/2006 | Sasaki et al. |
| 7,146,800 | B2 | 12/2006 | Toshioka et al. |
| 7,165,393 | B2 | 1/2007 | Betta et al. |
| 7,299,625 | B2 | 11/2007 | Uchida et al. |
| 7,332,135 | B2 * | 2/2008 | Gandhi et al. ................ 422/177 |
| 7,412,823 | B2 | 8/2008 | Reuter et al. |
| 7,454,900 | B2 | 11/2008 | Hayashi |
| 7,484,504 | B2 | 2/2009 | Kato et al. |
| 7,506,502 | B2 | 3/2009 | Nakano et al. |
| 7,549,284 | B2 | 6/2009 | Iihoshi et al. |
| 7,703,275 | B2 | 4/2010 | Asanuma et al. |
| 7,707,821 | B1 | 5/2010 | Legare |
| 7,861,516 | B2 | 1/2011 | Allansson et al. |
| 8,099,950 | B2 | 1/2012 | Kojima et al. |
| 8,215,101 | B2 | 7/2012 | Tsujimoto et al. |
| 8,261,532 | B2 | 9/2012 | Fukuda et al. |
| 8,281,569 | B2 | 10/2012 | Handa et al. |
| 8,434,296 | B2 | 5/2013 | Wada et al. |
| 8,572,950 | B2 | 11/2013 | Bisaiji et al. |
| 8,656,706 | B2 | 2/2014 | Umemoto et al. |
| 8,671,667 | B2 | 3/2014 | Bisaiji et al. |
| 8,679,410 | B2 | 3/2014 | Umemoto et al. |
| 8,689,543 | B2 | 4/2014 | Numata et al. |
| 8,695,325 | B2 * | 4/2014 | Bisaiji et al. ..................... 60/286 |
| 2001/0052232 | A1 | 12/2001 | Hoffmann et al. |
| 2002/0029564 | A1 | 3/2002 | Roth et al. |
| 2003/0010020 | A1 | 1/2003 | Taga et al. |
| 2003/0040432 | A1 | 2/2003 | Beall et al. |
| 2003/0101713 | A1 | 6/2003 | Betta et al. |
| 2004/0045285 | A1 | 3/2004 | Penetrante et al. |
| 2004/0050037 | A1 | 3/2004 | Betta et al. |
| 2004/0055285 | A1 | 3/2004 | Rohr et al. |
| 2004/0154288 | A1 | 8/2004 | Okada et al. |
| 2004/0175305 | A1 | 9/2004 | Nakanishi et al. |
| 2004/0187477 | A1 | 9/2004 | Okugawa et al. |
| 2005/0135977 | A1 | 6/2005 | Park et al. |
| 2005/0147541 | A1 | 7/2005 | Ajisaka et al. |
| 2006/0053778 | A1 | 3/2006 | Asanuma et al. |
| 2006/0107657 | A1 | 5/2006 | Bernler et al. |
| 2006/0153761 | A1 | 7/2006 | Bandl-Konrad et al. |
| 2006/0286012 | A1 | 12/2006 | Socha et al. |
| 2007/0016357 | A1 | 1/2007 | Nakagawa et al. |
| 2007/0028601 | A1 | 2/2007 | Duvinage et al. |
| 2007/0059223 | A1 | 3/2007 | Golunski et al. |
| 2007/0089403 | A1 | 4/2007 | Pfeifer et al. |
| 2007/0125073 | A1 | 6/2007 | Reuter et al. |
| 2007/0151232 | A1 | 7/2007 | Dalla Betta et al. |
| 2008/0022662 | A1 | 1/2008 | Yan |
| 2008/0053073 | A1 | 3/2008 | Kalyanaraman et al. |
| 2008/0102010 | A1 | 5/2008 | Bruck et al. |
| 2008/0120963 | A1 | 5/2008 | Morita et al. |
| 2008/0148711 | A1 | 6/2008 | Takubo |
| 2008/0154476 | A1 | 6/2008 | Takubo |
| 2008/0196398 | A1 | 8/2008 | Yan |
| 2008/0223020 | A1 | 9/2008 | Yoshida et al. |
| 2008/0276602 | A1 | 11/2008 | McCabe et al. |
| 2009/0000277 | A1 | 1/2009 | Yoshida et al. |
| 2009/0049824 | A1 | 2/2009 | Kojima et al. |
| 2009/0049825 | A1 | 2/2009 | Ohashi |
| 2009/0049826 | A1 | 2/2009 | Toshioka et al. |
| 2009/0077948 | A1 | 3/2009 | Mondori et al. |
| 2009/0084091 | A1 * | 4/2009 | Tsujimoto et al. ............... 60/299 |
| 2009/0118121 | A1 | 5/2009 | Sarai |
| 2009/0120072 | A1 | 5/2009 | Dalla Betta et al. |
| 2009/0151332 | A1 | 6/2009 | Toshioka et al. |
| 2009/0191108 | A1 | 7/2009 | Blanchard et al. |
| 2009/0196811 | A1 | 8/2009 | Yamashita et al. |
| 2009/0229251 | A1 | 9/2009 | Kadowaki |
| 2009/0249768 | A1 | 10/2009 | Asanuma et al. |
| 2009/0266057 | A1 | 10/2009 | Tsujimoto et al. |
| 2009/0282809 | A1 | 11/2009 | Toshioka |
| 2009/0288393 | A1 | 11/2009 | Matsuno et al. |
| 2009/0313970 | A1 | 12/2009 | Iida |
| 2010/0005873 | A1 | 1/2010 | Katoh et al. |
| 2010/0055012 | A1 | 3/2010 | Grisstede et al. |
| 2010/0107613 | A1 | 5/2010 | Masuda et al. |
| 2010/0115923 | A1 | 5/2010 | Tsujimoto et al. |
| 2010/0126148 | A1 | 5/2010 | Morishima et al. |
| 2010/0132356 | A1 | 6/2010 | Lee |
| 2010/0154387 | A1 | 6/2010 | Shibata et al. |
| 2010/0233051 | A1 | 9/2010 | Grisstede et al. |
| 2010/0236224 | A1 * | 9/2010 | Kumar et al. .................... 60/297 |
| 2010/0242459 | A1 | 9/2010 | Tsujimoto et al. |
| 2011/0041486 | A1 | 2/2011 | Kato et al. |
| 2011/0047984 | A1 | 3/2011 | Lee et al. |
| 2011/0047988 | A1 | 3/2011 | Lewis et al. |
| 2011/0113754 | A1 | 5/2011 | Kohara et al. |
| 2011/0120100 | A1 | 5/2011 | Yin et al. |
| 2011/0131952 | A1 | 6/2011 | Onodera et al. |
| 2011/0173950 | A1 | 7/2011 | Wan et al. |
| 2011/0209459 | A1 | 9/2011 | Hancu et al. |
| 2012/0122660 | A1 | 5/2012 | Andersen et al. |
| 2012/0124967 | A1 | 5/2012 | Yang et al. |
| 2012/0124971 | A1 | 5/2012 | Bisaiji et al. |
| 2012/0131908 | A1 | 5/2012 | Bisaiji et al. |
| 2013/0000284 | A1 | 1/2013 | Bisaiji et al. |
| 2013/0011302 | A1 | 1/2013 | Bisaiji et al. |
| 2013/0022512 | A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | A-H08-117601 | 5/1996 |
| JP | A-09-004437 | 1/1997 |
| JP | A-09-220440 | 8/1997 |
| JP | A-11-30117 | 2/1999 |
| JP | A-11-062559 | 3/1999 |
| JP | A-11-081994 | 3/1999 |
| JP | A-2000-257419 | 9/2000 |

(56) References Cited

FOREIGN PATENT DOCUMENTS

| | | |
|---|---|---|
| JP | A-2002-188429 | 7/2002 |
| JP | A-2004-016850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 | 1/2008 |
| WO | WO 2009/016822 | 2/2009 |
| WO | WO 2009/056958 | 5/2009 |
| WO | WO 2009/082035 | 7/2009 |
| WO | WO 2011/114499 | 9/2011 |
| WO | WO 2011/114501 | 9/2011 |
| WO | WO 2011/118044 | 9/2011 |

OTHER PUBLICATIONS

Aug. 8, 2013 Office Action issued in U.S. Appl. No. 13/258,483.
Feb. 6, 2014 Corrected Notice of Allowability issued in U.S. Appl. No. 13/202,694.
Dec. 21, 2010 International Search Report issued in International Patent Application No. PCT/JP2010/065449 (with translation).
Dec. 27, 2011 International Search Report issued in International Patent Application No. PCT/JP2011/075618 (with translation).
Jun. 15, 2010 International Search Report issued in International Patent Application No. PCT/JP2010/054730 (with translation).
Nov. 22, 2010 International Search Report issued in International Patent Application No. PCT/JP2010/065186 (with translation).
Jan. 18, 2011 International Search Report issued in International Patent Application No. PCT/JP2010/067705.
Jan. 18, 2011 International Search Report issued in International Application No. PCT/JP2010/067707.
Jan. 18, 2011 International Search Report issued in International Patent Application No. PCT/JP2010/068785.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 21, 2011 International Search Report issued in International Patent Application No. PCT/JP2011/059880 (with translation).
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303 (with translation).
Mar. 15, 2011 International Search Report issued in International Patent Application No. PCT/JP2011/053429 (with translation).
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 15, 2013 Office Action in U.S. Appl. No. 13/202,694.
May 17, 2011 International Search Report issued in International Patent Application No. PCT/JP2011/057264 (with translation).
May 2, 2014 Office Action issued in U.S. Appl. No. 13/263,660.
Mar. 28, 2014 Notice of Allowance issued in U.S. Appl. No. 13/582,862.
Mar. 4, 2014 Notice of Allowance issued in U.S. Appl. No. 13/255,786,.
Nov. 13, 2013 Notice of Allowance issued in U.S. Appl. No. 13/202,692.
Oct. 17, 2013 Notice of Allowance issued in U.S. Appl. No. 13/202,694.
Nov. 22, 2010 International Search Report issued in International Patent Application No. PCT/JP2010/065187.
Nov. 26, 2012 Office Action issued in U.S. Appl. No. 13/202,694.
Oct. 26, 2010 International Search Report issued in International Patent Application No. PCT/JP2010/063135.
Oct. 26, 2012 Office Action issued in U.S. Appl. No. 13/202,692.
Oct. 23, 2013 Office Action issued in U.S. Appl. No. 13/263,272,.
Apr. 23, 2014 Office Action issued in U.S. Appl. No. 13/260,986.
Apr. 3, 2014 Office Action issued in U.S. Appl. No. 13/259,574.
Dec. 20, 2013 Office Action issued in U.S. Appl. No. 13/264,230.
Jul. 1, 2014 Office Action issued in U.S. Appl. No. 13/257,789.
Jul. 24, 2013 Office Action issued in U.S. Appl. No. 13/202,692.
May 7, 2014 Office Action issued in U.S. Appl. No. 13/264,062.
May 8, 2014 Office Action issued in U.S. Appl. No, 13/375,674.
U.S. Appl. No. 13/202,692 in the name of Umemoto et al., filed Sep. 20, 2011.
U.S. Appl. No. 13/202,733 in the name of Bisaui et al., filed Sep. 30, 2011.
U.S. Appl. No. 13/257,789 in the name of Nishioka et al., filed on Oct. 14, 2011.
U.S. Appl. No. 13/258,483 in the name of Numata et al., filed Sep. 22, 2011.
U.S. Appl. No. 13/259,574 in the name of Tsukamoto et al., filed Sep. 23, 2011.
U.S. Appl. No. 13/259,885 in the name of Umemoto et al., filed Sep. 23, 2011.
U.S. Appl. No. 13/260,986 in the name of Watanabe et al., filed Sep. 29, 2011.
U.S. Appl. No. 13/262,858 in the name of Bisaiji et al., filed Oct. 4, 2011.
U.S. Appl. No. 13/263,272 in the name of Bisaiji et al., filed Oct. 6, 2011.
U.S. Appl. No. 13/263,660 in the name of Umemoto et al., filed Oct. 7, 2011.
U.S. Appl. No. 13/264,062 in the name of Watanabe et al., filed Oct. 12, 2011.
U.S. Appl. No. 13/264,230 in the name of Bisadi et al., filed Oct. 13, 2011.

(56) References Cited

OTHER PUBLICATIONS

U.S. Appl. No. 13/264,594 in the name of Inoue et al., filed Oct. 14, 2011.
U.S. Appl. No. 13/264,884 in the name of Bisaiji et al., filed Oct. 17, 2011.
U.S. Appl. No. 13/375,674 in the name of Inoue et al., filed Dec. 1, 2011.
U.S. Appl. No. 13/578,148 in the name of Umemoto et al., filed Aug. 9, 2012.
U.S. Appl. No. 13/58,186 in the name of Kazuhiro Umemoto et al., filed Aug. 24, 2012.
U.S. Appl. No. 13/580,000 in the name of Bisaiji et al., filed Aug. 20, 2012.
U.S. Appl. No. 13/582,862 in the name of Uenishi et al., filed Sep. 5, 2012.
U.S. Appl. No. 13/582,909 in the name of Kazuhiro Umemoto et al., filed Sep. 5, 2012.
U.S. Appl. No. 13/202,694 in the name of Bisaui et al., filed Sep. 19, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
Nov. 22, 2010 Written Opinion issued in International Patent Application No. PCT/JP2010/065186 (with translation).
Dec. 27, 2011 Written Opinion issued in International Patent Application No. PCT/JP2011/075618.
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in PCT/JP2010/054740 (with translation).
Jun. 15, 2010 Written Opinion issued in PCT/JP2010/054740 (with translation).
Jun. 20, 2012 Search Report issued in European Patent Application No. 10845966.0.
Jun. 15, 2010 International Search Report issued in International Application No. PCT/JP2010/054731 (with translation).
Jun. 29, 2010 International Search Report issued in International Patent Application No. PCT/JP2010/056345.
Apr. 4, 2013 Office Action issued in U.S. Appl. No. 13/255,710.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
Oct. 24, 2013 Office Action issued in U.S. Appl. No. 13/255,710.
Jan. 17, 2013 Office Action issued in U.S. Appl. No. 13/202,733.
International Search Report dated Jun. 15, 2010 in International Application No. PCT/JP2010/054729.
International Search Report issued in International Application No. PCT/JP2011/066628 dated Sep. 13, 2011 (with Translation).
U.S. Appl. No. 13/502,210 in the name of Bisaiji et al., filed on Apr. 16, 2012.
U.S. Appl. No. 13/499,211 in the name of Bisaiji et al., filed Mar. 29, 2012.
Jan. 22, 2014 Office Action issued in U.S. Appl. No. 13/499,211.
May 27, 2014 Office Action issued in U.S. Appl. No. 13/255,710.
Sep. 18, 2014 Notice of Allowance issued in U.S. Appl. No. 13/255,710.
U.S. Appl. No. 13/934,080 in the name of Bisaiji et al., filed Jul. 2, 2013.
Oct. 2, 2014 Office Action issued in U.S. Appl. No. 13/582,862.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/262,506 in the name of Bisaiji et al., filed Sep. 30, 2011.
U.S. Appl. No. 13/264,230 in the name of Bisaiji et al., filed Oct. 13, 2011.
U.S. Appl. No. 13/202,694 in the name of Bisaiji et al., filed Sep. 19, 2011.
U.S. Appl. No. 13/202,733 in the name of Bisaiji et al., filed Sep. 30, 2011.
Dec. 22, 2014 Office Action issued in U.S. Appl. No. 13/264,230.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature and which can suppress the exhaust of $NO_2$ which is considered particularly problematic in $NO_x$.

Solution to Problem

According to the present invention, there is provided an exhaust purification system of an internal combustion engine in which a hydrocarbon feed valve for feeding hydrocarbons is arranged inside of an engine exhaust passage, an exhaust purification catalyst for reacting $NO_x$ contained in exhaust gas and reformed hydrocarbons is arranged inside of the engine exhaust passage downstream of the hydrocarbon feed valve, a precious metal catalyst is carried on an exhaust gas flow surface of the exhaust purification catalyst, a basic exhaust gas flow surface part is formed around the precious metal catalysts, the exhaust purification catalyst has a property of reducing the $NO_x$ which is contained in exhaust gas if a concentration of hydrocarbons flowing into the exhaust purification catalyst is made to vibrate within a predetermined range of amplitude and within a predetermined range of period and has a property of being increased in storage amount of $NO_x$ which is contained in exhaust gas if the vibration period of the hydrocarbon concentration is made longer than the predetermined range, at the time of engine operation, the injection amount of hydrocarbons from the hydrocarbon feed valve is controlled so that the amplitude of the change of concentration of hydrocarbons flowing into the exhaust purification catalyst becomes within the above-mentioned predetermined range of amplitude, and the injection period of hydrocarbons from the hydrocarbon feed valve is controlled so that the concentration of hydrocarbons flowing into the exhaust purification catalyst vibrates by the above-mentioned predetermined range of period, an $NO_2$ reduction catalyst which is able to reduce $NO_2$ which is contained in exhaust gas to NO when hydrocarbons are fed is arranged inside of the engine exhaust passage downstream of the exhaust purification catalyst, and, when the $NO_2$ which is contained in the exhaust gas should be reduced to NO, the amplitude of change of the concentration of hydrocarbons flowing into the exhaust purification catalyst is increased to increase a pass through amount of hydrocarbons which pass straight through the exhaust purification catalyst.

Advantageous Effects of Invention

Even if the temperature of the exhaust purification catalyst becomes a high temperature, a high $NO_x$ purification rate can be obtained, while by increasing the pass through amount of hydrocarbons, the exhaust of $NO_2$ can be suppressed.

DESCRIPTION OF EMBODIMENTS

Figure 1:
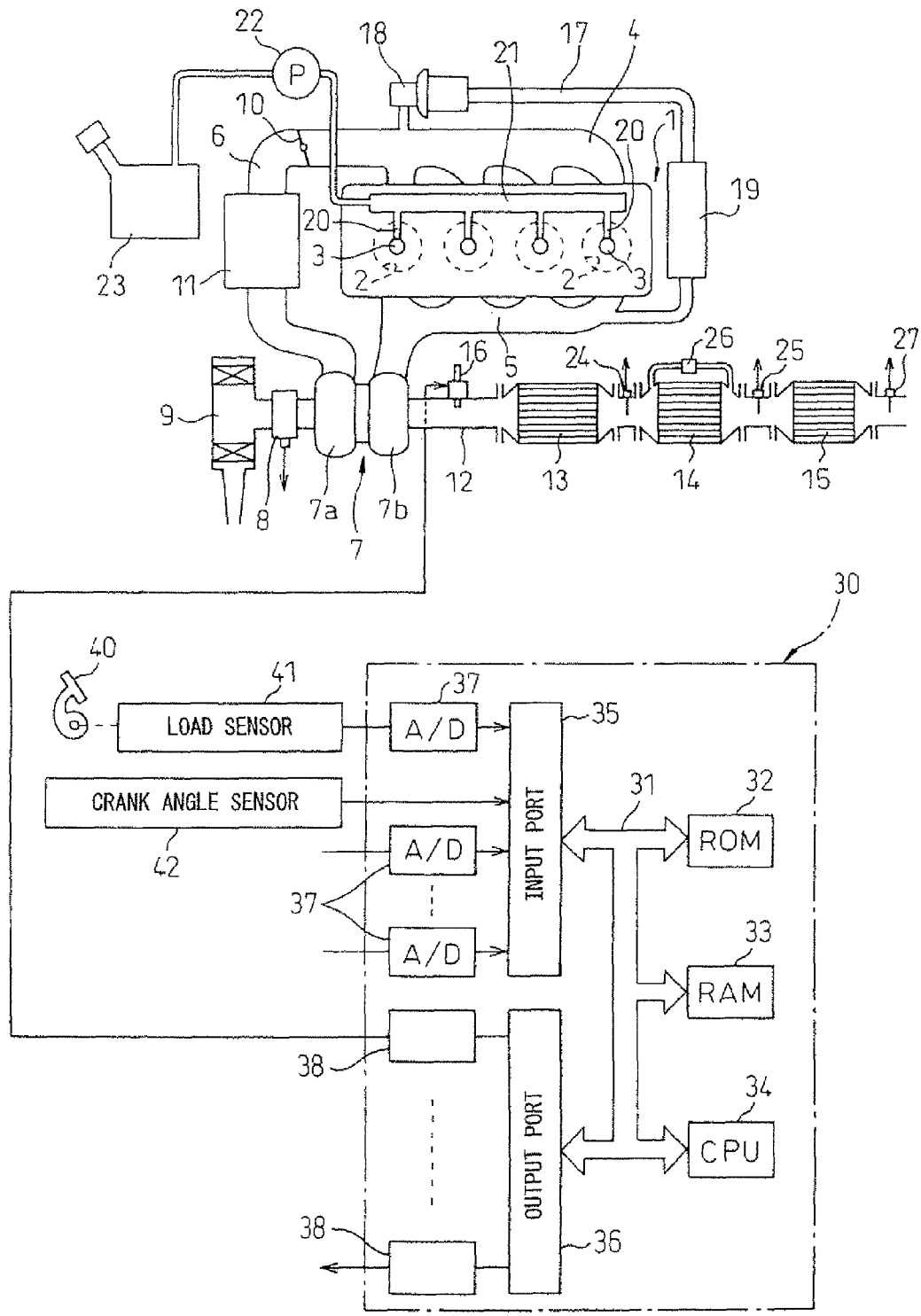
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. An outlet of the exhaust turbine 7b is connected through an exhaust pipe 12 to an inlet of an exhaust purification catalyst 13, while an outlet of the exhaust purification catalyst 13 is connected to an inlet of a particulate filter 14 for trapping particulate which is contained in the exhaust gas. Further, an outlet of the particulate filter 14 is connected to an $NO_2$ reduction catalyst 15. This $NO_2$ reduction catalyst 15 is comprised of any of a reduction catalyst, oxidation catalyst, and $NO_x$ selective reduction catalyst. In the embodiment shown in FIG. 1, this $NO_2$ reduction catalyst 15 is comprised of an oxidation catalyst.

Upstream of the exhaust purification catalyst 13 inside the exhaust pipe 12, a hydrocarbon feed valve 16 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 16. Note that, the present invention can also be applied to a spark ignition type internal combustion engine in which fuel is burned under a lean air-fuel ratio. In this case, from the hydrocarbon feed valve 16, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 17. Inside the EGR passage 17, an electronically controlled EGR control valve 18 is arranged. Further, around the EGR passage 17, a cooling device 19 is arranged for cooling EGR gas flowing through the inside of the EGR passage 17. In the embodiment shown in FIG. 1, the engine cooling water is guided to the inside of the cooling device 19 where the engine cooling water is used to cool the EGR gas. On the other hand, each fuel injector 3 is connected through a fuel feed tube 20 to a common rail 21. This common rail 21 is connected through an electronically controlled variable discharge fuel pump 22 to a fuel tank 23. The fuel which is stored inside of the fuel tank 23 is fed by the fuel pump 22 to the inside of the common rail 21. The fuel which is fed to the inside of the common rail 21 is fed through each fuel feed tube 20 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 24 is attached for detecting the temperature of the exhaust purification catalyst 13. Further, downstream of the particulate filter 14, a temperature sensor 25 is attached for detecting the temperature of the particulate filter 14. At the particulate filter 14, a differential pressure sensor 26 is attached for detecting the differential pressure before and after the particulate filter 14. Furthermore, downstream of the $NO_2$ reduction catalyst 15, a temperature sensor 27 is attached for detecting the temperature of the $NO_2$ reduction catalyst 15. The output signals of these temperature sensors 24, 25, and 27, differential pressure sensor 26, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 16, EGR control valve 18, and fuel pump 22.

Figure 2:
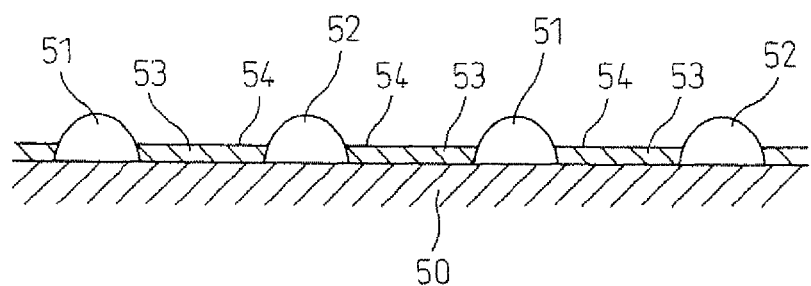
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or other rare earth and silver Ag, copper Cu, iron Fe, iridium Ir, or other metal which can donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
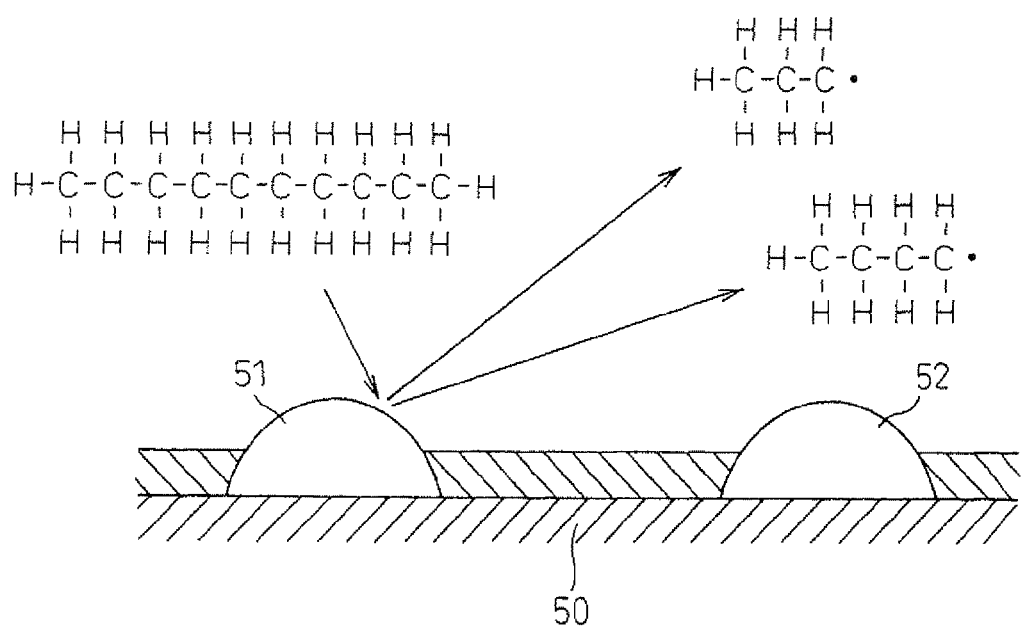
FIG. 3 is a view for explaining an oxidation reaction in an exhaust purification catalyst.

If hydrocarbons are injected from the hydrocarbon feed valve 16 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 16 become radical hydrocarbons HC with a small carbon number by the catalyst 51.

Figure 4:
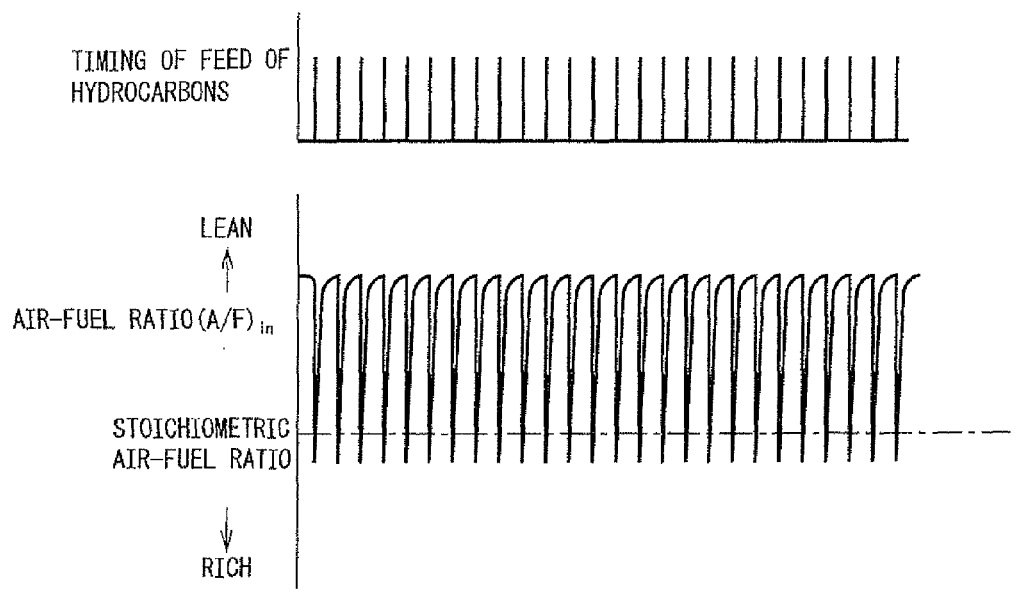
FIG. 4 is a view showing a change of an air-fuel ratio of exhaust gas flowing into an exhaust purification catalyst.

FIG. 4 shows the timing of feed of hydrocarbons from the hydrocarbon feed valve 16 and the changes in the air-fuel ratio (A/F)in of the exhaust gas flowing into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
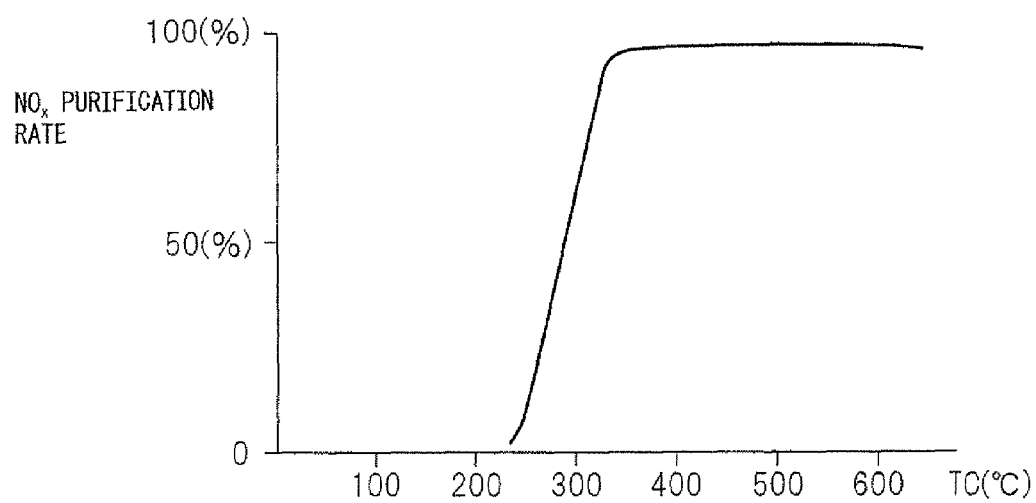
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
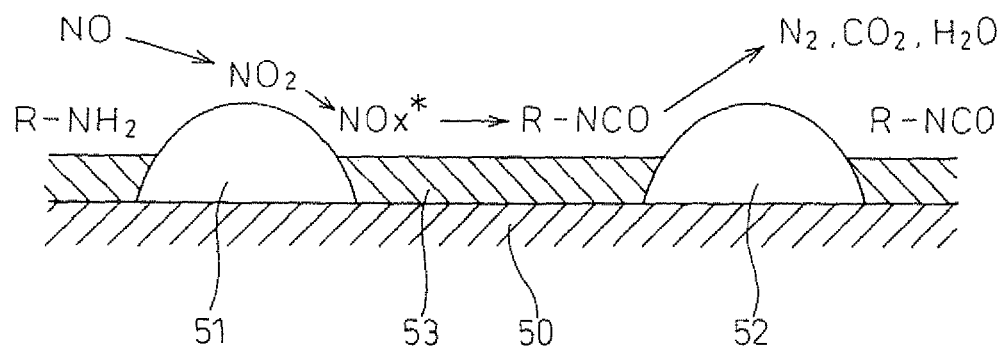
FIGS. 6A and 6B are views for explaining an oxidation reduction reaction in an exhaust purification catalyst.
Figure 6B:
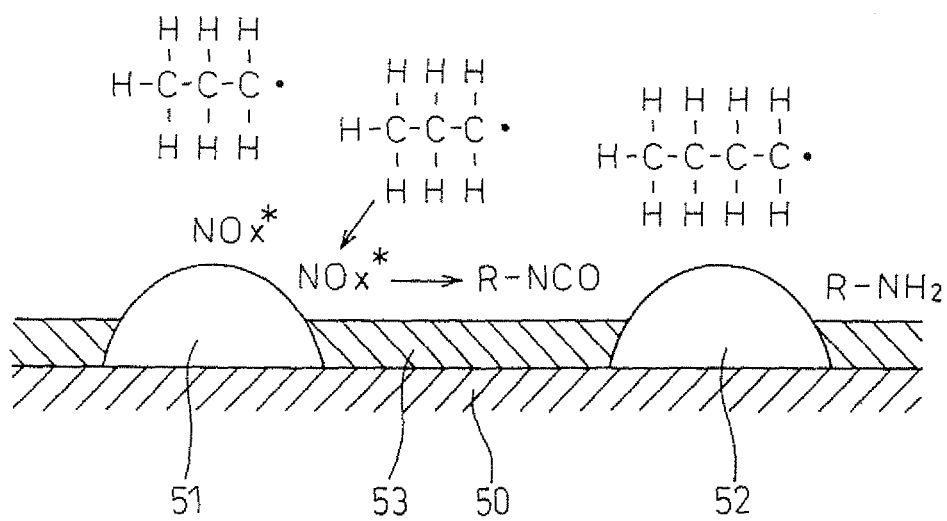

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 16 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is further oxidized and becomes $NO_3$. Further part of the $NO_2$ becomes $NO_2^-$. In this case, the amount of production of $NO_3$ is far greater than the amount of production of $NO_2^-$. Therefore, on the platinum Pt 51, a large amount of $NO_3$ and a small amount of $NO_2^-$ are produced. These $NO_3$ and $NO_2^-$ are strong in activity. Below, these $NO_3$ and $NO_2^-$ will be referred to as the active $NO_x^*$.

On the other hand, if hydrocarbons are fed from the hydrocarbon feed valve 16, as shown in FIG. 3, the hydrocarbons are reformed and become radicalized inside of the exhaust purification catalyst 13. As a result, as shown in FIG. 6B, the hydrocarbon concentration around the active $NO_x^*$ becomes higher. In this regard, after the active $NO_x^*$ is produced, if the state of a high oxygen concentration around the active $NO_x^*$ continues for a predetermined time or more, the active $NO_x^*$ is oxidized and is absorbed in the basic layer 53 in the form of nitrate ions $NO_3^-$. However, if the hydrocarbon concentration around the active $NO_x^*$ is made higher before this predetermined time passes, as shown in FIG. 6B, the active $NO_x^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_x^*$ react. At this time, the active $NO_x^*$ reacts with the reducing intermediate R—NCO or R—$NH_2$ to become $N_2$, $CO_2$, $H_2O$, therefore the $NO_x$ is removed.

In this way, in the exhaust purification catalyst 13, by making the concentration of hydrocarbons flowing into the exhaust purification catalyst 13 higher, a reducing intermediate is produced. The concentration of hydrocarbons flowing into the exhaust purification catalyst 13 is lowered and the oxygen concentration is raised so that the active $NO_x^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_x^*$. That is, the concentration of hydrocarbons flowing into the exhaust purification catalyst 13 has to be made to vibrate within a predetermined range of amplitude. Note that, in this case, a sufficient amount of reducing intermediate R—NCO or R—$NH_2$ has to be held on the basic layer 53, that is, on the basic exhaust gas flow surface part 54, until the produced reducing intermediate reacts with the active $NO_x^*$. For this reason, the basic exhaust gas flow surface part 54 is provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_x^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. $No_x$ is reduced by the reducing action of the reducing intermediate R—NCO or R—$NH_2$ held on the basic exhaust gas flow surface part 54, and the vibration period of the hydrocarbon concentration is made the vibration period required for continuation of the production of the reducing intermediate R—NCO or R—$NR_2$. Incidentally, in the example shown in FIG. 4, the injection interval is made 3 seconds.

Figure 7A:
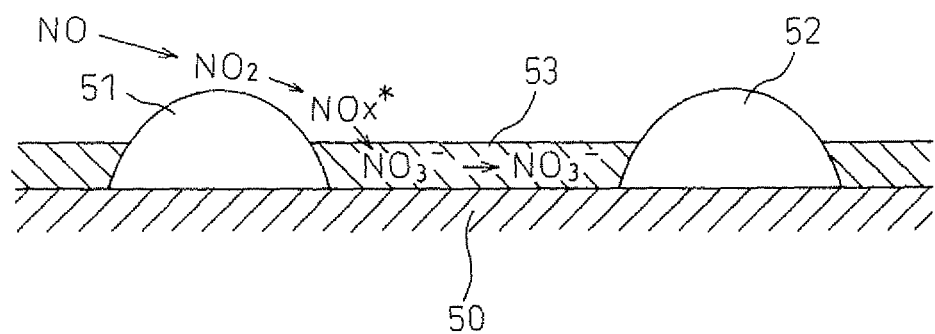
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_x^*$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
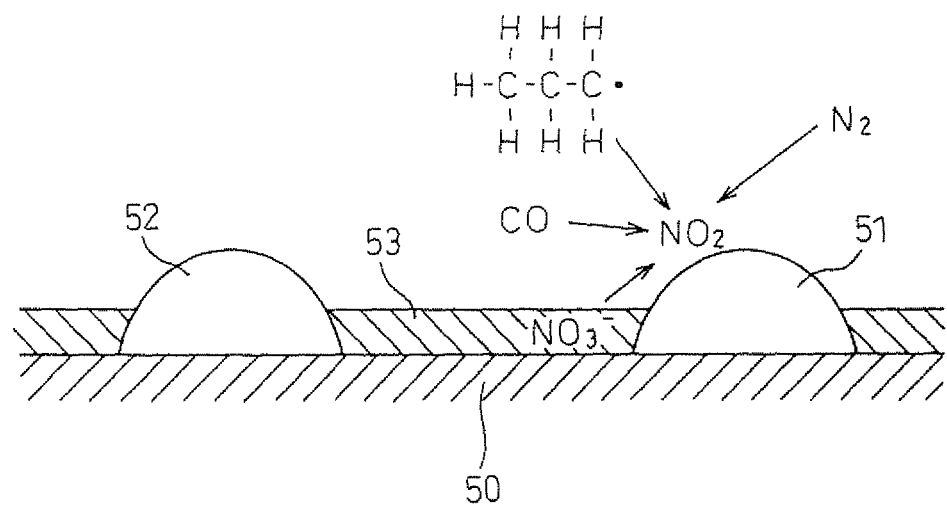

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
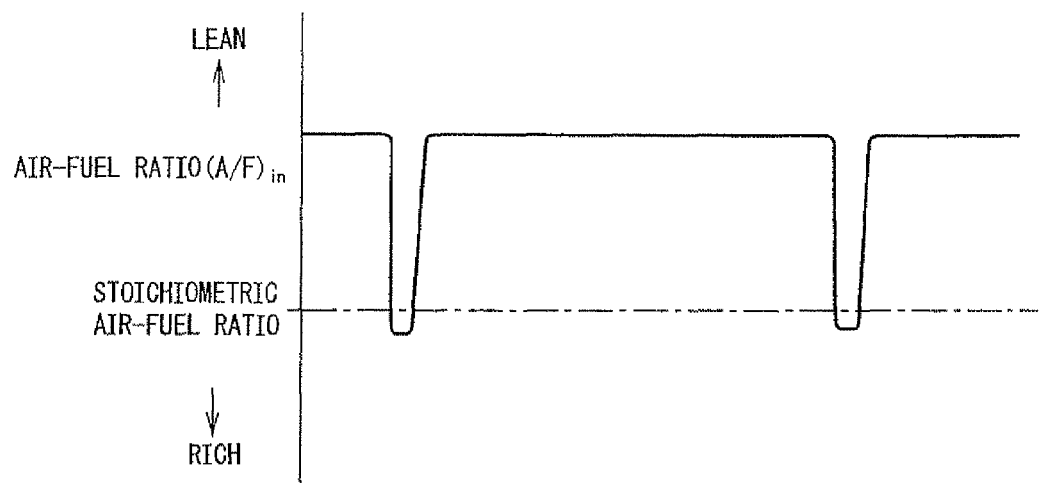
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and exhaust passage upstream of the exhaust purification catalyst 13 is referred to as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
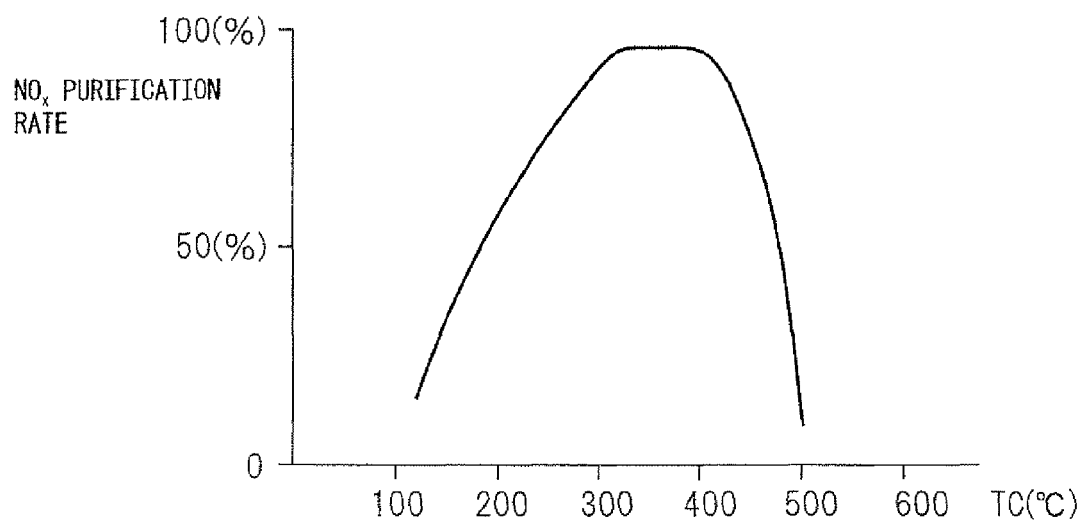
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, a hydrocarbon feed valve 16 for feeding hydrocarbons is arranged inside of an engine exhaust passage, an exhaust purification catalyst 13 for reacting $NO_x$ contained in exhaust gas and reformed hydrocarbons is arranged inside of an engine exhaust passage downstream of the hydrocarbon feed valve 16, a precious metal catalyst 51, 52 is carried on an exhaust gas flow surface of the exhaust purification catalyst 13, a basic exhaust gas flow surface part 54 is formed around the precious metal catalysts 51 and 52, the exhaust purification catalyst 13 has a property of reducing the $NO_x$ which is contained in exhaust gas if a concentration of hydrocarbons flowing into the exhaust purification catalyst 13 is made to vibrate within a predetermined range of amplitude and within a predetermined range of period and has a property of being increased in storage amount of $NO_x$ which is contained in exhaust gas if the vibration period of the hydrocarbon concentration is made longer than this predetermined range, and, at the time of engine operation, the concentration of hydrocarbons flowing into the exhaust purification catalyst 13 is made to vibrate within the predetermined range of amplitude and within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the first $NO_x$ purification method.

Next, referring to FIG. 10 to FIG. 15, this first $NO_x$ purification method will be explained in a bit more detail.

Figure 10:
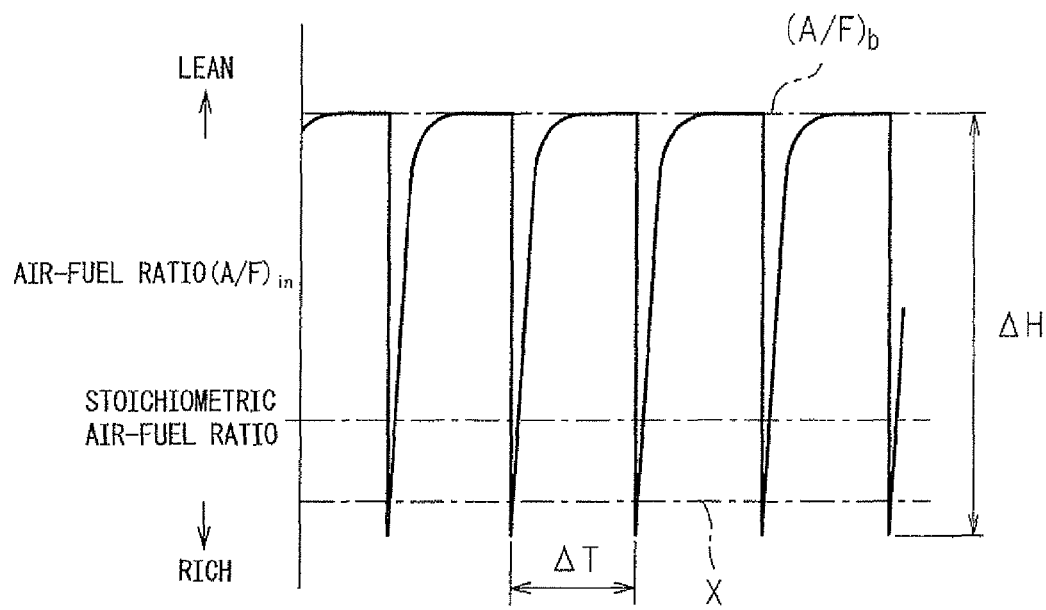
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in used for producing the reducing intermediate without the produced active $NO_x$* being stored in the form of nitrates inside the basic layer 53 much at all. To make the active $NO_x$* and the reformed hydrocarbons react to produce a reducing intermediate, the air-fuel ratio (A/F)in has to be made lower than this upper limit X of the air-fuel ratio.

In other words, in FIG. 10, X shows the lower limit of the concentration of hydrocarbons required for making the active $NO_x$* and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_x$*, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
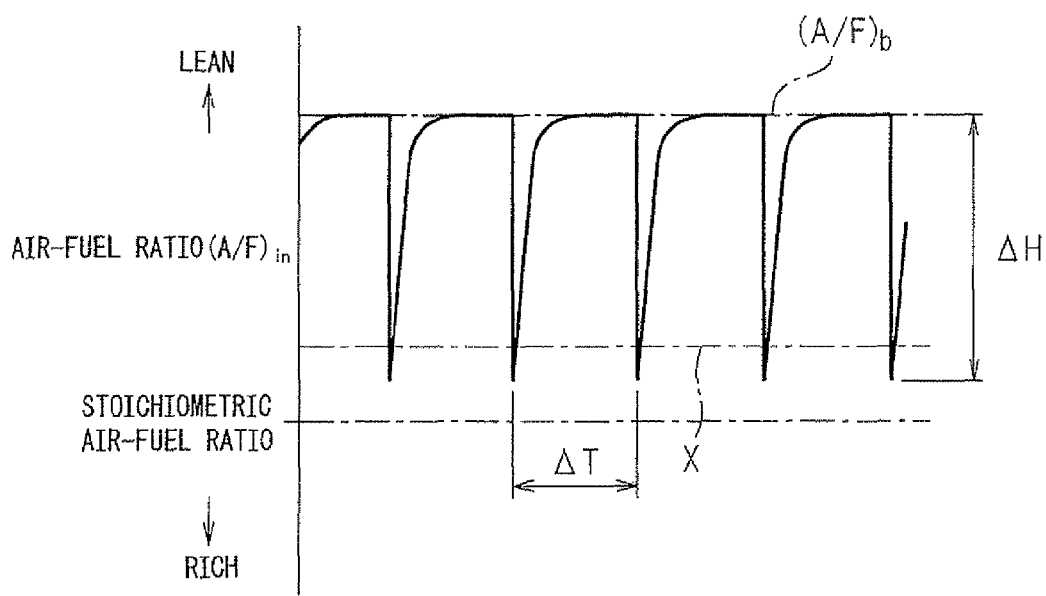
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
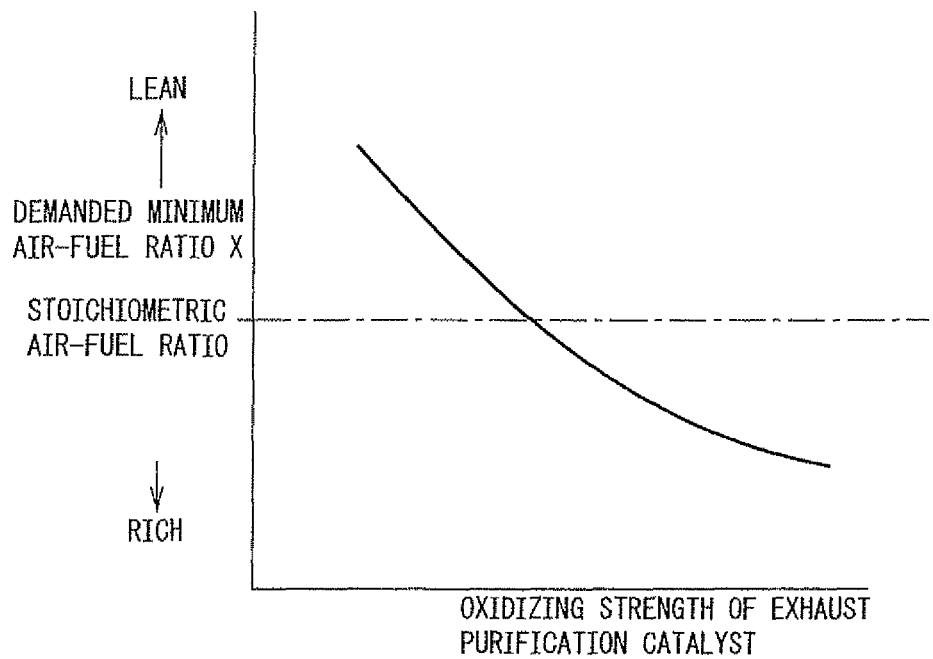
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
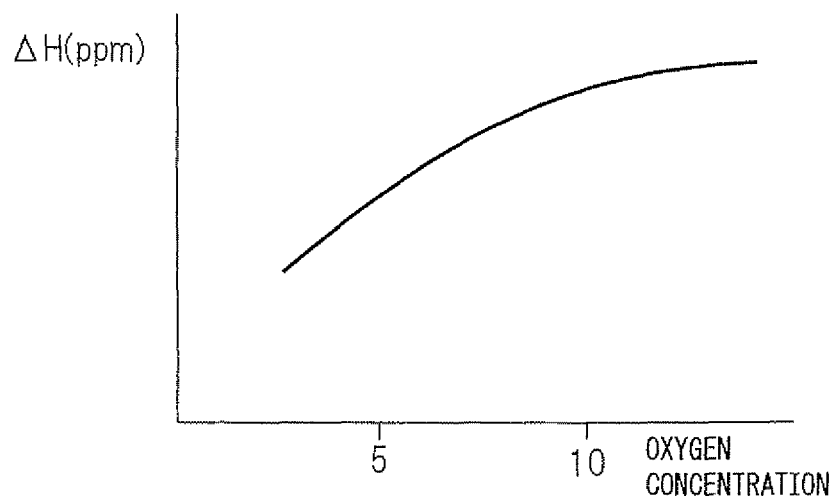
FIG. 13 is a view showing a relationship between an oxygen concentration in exhaust gas and an amplitude ΔH of a hydrocarbon concentration giving the same $NO_x$ purification rate.

FIG. 13 shows the relationship between the oxygen concentration in the exhaust gas before the hydrocarbons are fed and the amplitude $\Delta H$ of the hydrocarbon concentration when the same $NO_x$ purification rate is obtained. To obtain the same $NO_x$ purification rate from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_x$ purification rate, the higher the base air-fuel ratio (A/F)b, the greater the amplitude $\Delta T$ of the hydrocarbon concentration has to be made. In other words, to remove the $NO_x$ well, the lower the base air-fuel ratio (A/F)b, the more the amplitude $\Delta T$ of the hydrocarbon concentration can be reduced.

Figure 14:
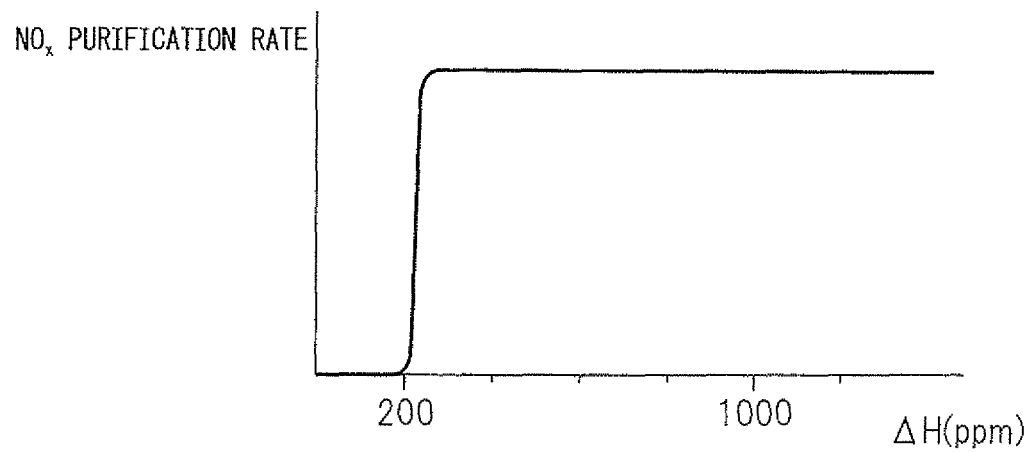
FIG. 14 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
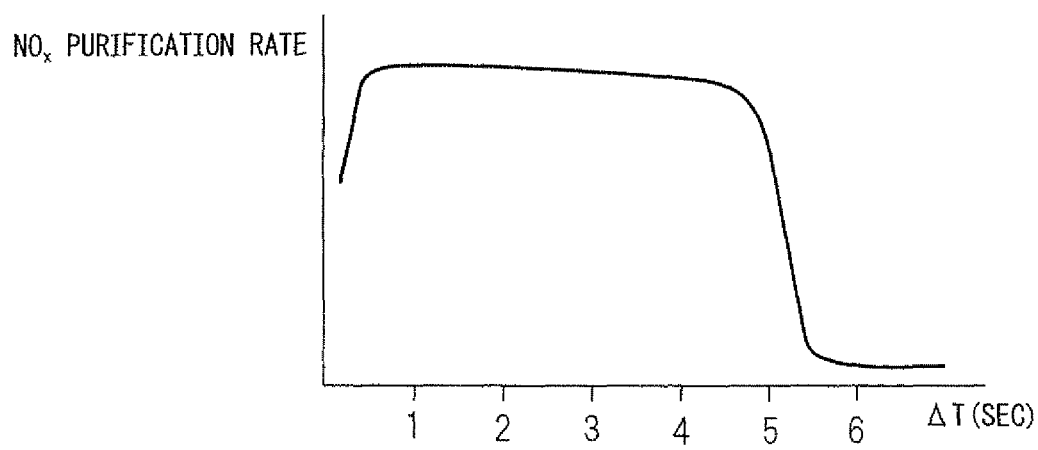
FIG. 15 is a view showing a relationship of a vibration period ΔT of a hydrocarbon concentration and an $NO_x$ purification rate.

Further, if the vibration period $\Delta T$ of the hydrocarbon concentration becomes longer, the oxygen concentration around the active $NO_x^*$ becomes higher in the time after the hydrocarbons are fed to when the hydrocarbons are next fed. In this case, if the vibration period $\Delta T$ of the hydrocarbon concentration becomes longer than about 5 seconds, the majority of the active $NO_x^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_x$ purification rate falls. Therefore, in the present invention, the vibration period of the hydrocarbon concentration is made from 0.3 second to 5 seconds.

Next, while referring to FIG. 16 to FIG. 19, an $NO_x$ purification method in the case when making the exhaust purification catalyst 13 function as an $NO_x$ storage catalyst will be explained in detail. The $NO_x$ purification method in the case when making the exhaust purification catalyst 13 function as an $NO_x$ storage catalyst in this way will be referred to below as the second $NO_x$ purification method.

Figure 16:
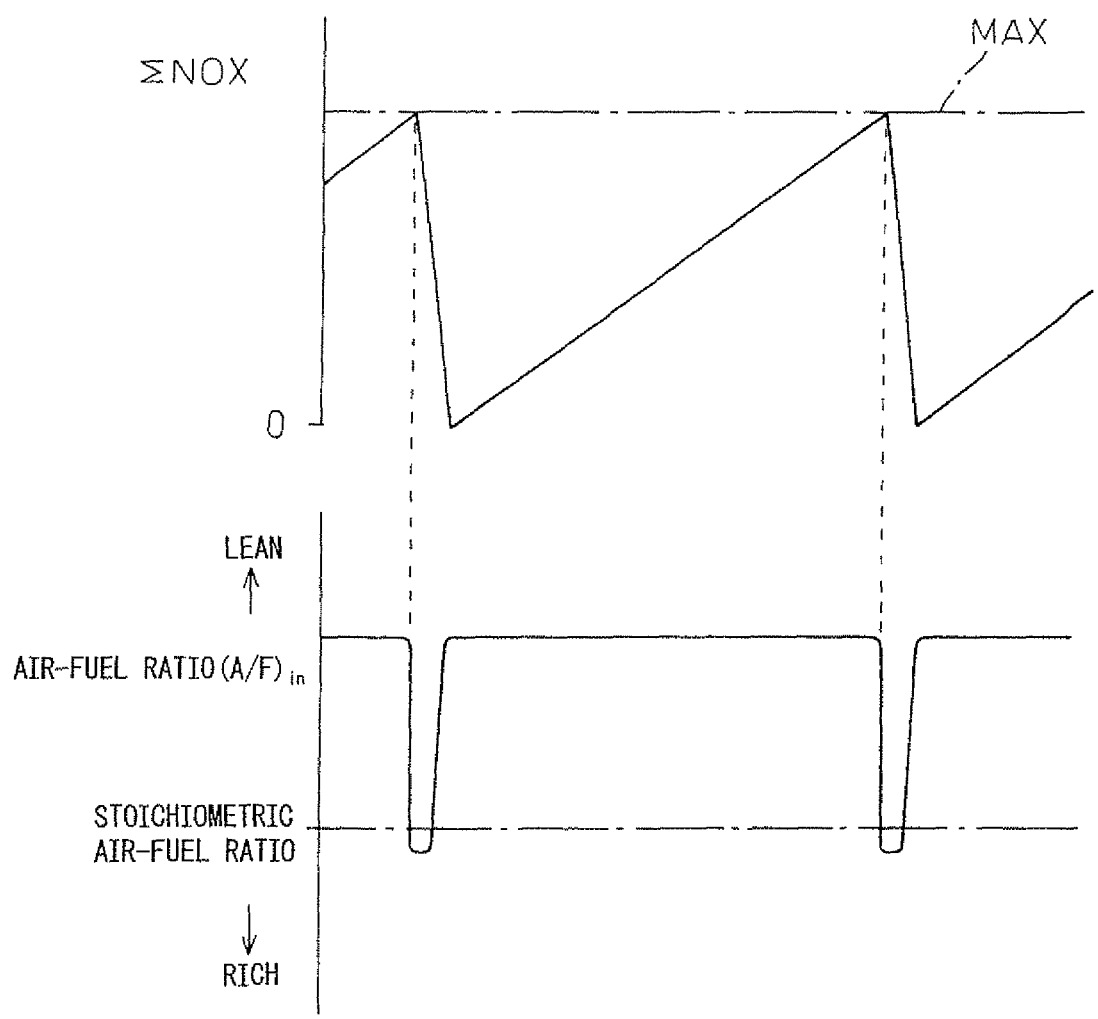
FIG. 16 is a view showing a change in the air-fuel ratio of the exhaust gas flowing to the exhaust purification catalyst etc.

In this second $NO_x$ purification method, as shown in FIG. 16, when the stored $NO_x$ amount $\Sigma NOX$ of $NO_x$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of the exhaust gas is made rich, the $NO_x$ which was stored in the basic layer 53 when the air-fuel ratio (A/F)in of the exhaust gas was lean is released from the basic layer 53 all at once and reduced. Due to this, the $NO_x$ is removed.

Figure 17:
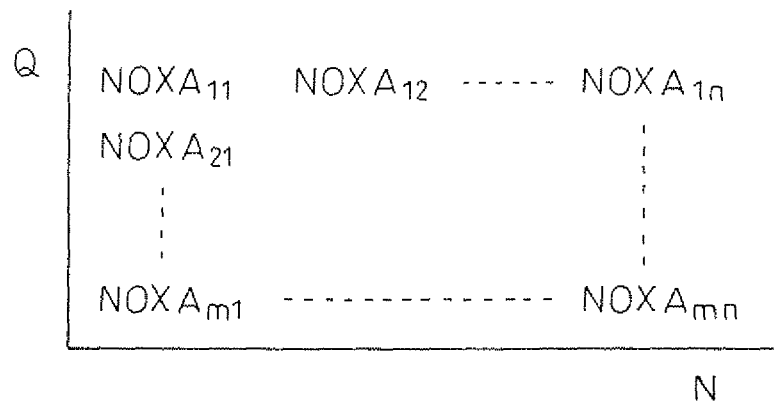
FIG. 17 is a view showing a map of an exhausted $NO_x$ amount NOXA.

The stored $NO_x$ amount $\Sigma NOX$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 17 in advance in the ROM 32. The stored $NO_x$ amount $\Sigma NOX$ is calculated from the exhausted $NO_x$ amount NOXA. In this case, as explained before, the period in which the air-fuel ratio (A/F)in of the exhaust gas is made rich is usually 1 minute or more.

Figure 18:
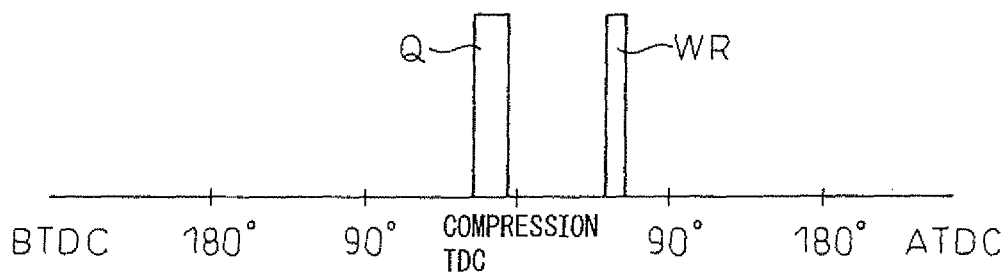
FIG. 18 is a view showing a fuel injection timing.
Figure 19:
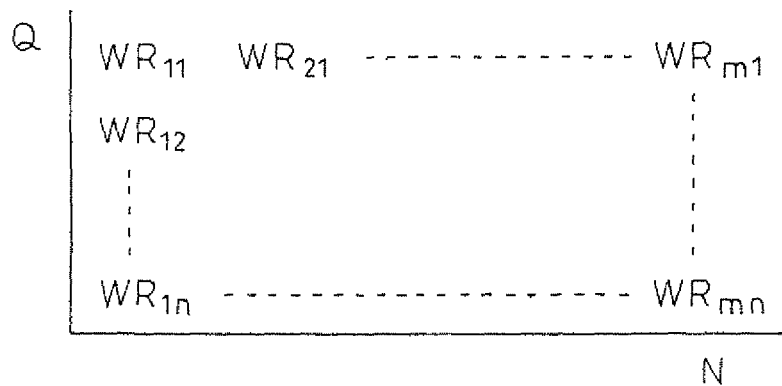
FIG. 19 is a view showing a map of a hydrocarbon feed amount WR.

In this second $NO_x$ purification method, as shown in FIG. 18, the fuel injector 3 injects additional fuel WR into the combustion chamber 2 in addition to the combustion-use fuel Q so that the air-fuel ratio (A/F)in of the exhaust gas flowing into the exhaust purification catalyst 13 is made rich. Note that, in FIG. 18, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 19 in advance in the ROM 32. Of course, in this case, it is also possible to make the amount of feed of hydrocarbons from the hydrocarbon feed valve 16 increase so as to make the air-fuel ratio (A/F)in of the exhaust gas rich.

Now, returning again to the explanation of the first $NO_x$ purification method, to use the first $NO_x$ purification method to remove the $NO_x$ well, as explained before, the amplitude $\Delta H$ and vibration period $\Delta T$ of the hydrocarbon concentration have to be suitably controlled. That is, to use the first $NO_x$ purification method to remove the $NO_x$ well, the amplitude $\Delta H$ of the hydrocarbon concentration has to be controlled so that the air-fuel ratio (A/F)in of the exhaust gas which flows into the exhaust purification catalyst 13 becomes the demanded minimum air-fuel ratio X or less and the vibration period $\Delta T$ of the hydrocarbon concentration has to be controlled to 0.3 second to 5 seconds.

In this case, in the present invention, the amplitude $\Delta H$ of the hydrocarbon concentration is controlled by controlling the injection amount of hydrocarbons from the hydrocarbon feed valve 16 and the vibration period $\Delta T$ of the hydrocarbon concentration is controlled by controlling the injection period of hydrocarbons from the hydrocarbon feed valve 16. Note that in this case, the injection amount of hydrocarbons from the hydrocarbon feed valve 16 is controlled by controlling at least one of the injection time or injection pressure of hydrocarbons from the hydrocarbon feed valve 16.

In this regard, when the first $NO_x$ purification method is used for the $NO_x$ purification action, what is most demanded is that it be able to obtain the highest $NO_x$ purification rate no matter what the operating state and that the fed hydrocarbons not pass straight through the exhaust purification catalyst 13. The inventors repeatedly studied this point and as a result learned that in the exhaust purification catalyst 13, the amount of completely oxidized hydrocarbons and the amount of partially oxidized hydrocarbons govern the $NO_x$ purification rate and the pass through amount of hydrocarbons. Next, this will be explained with reference to FIG. 20.

Figure 20:
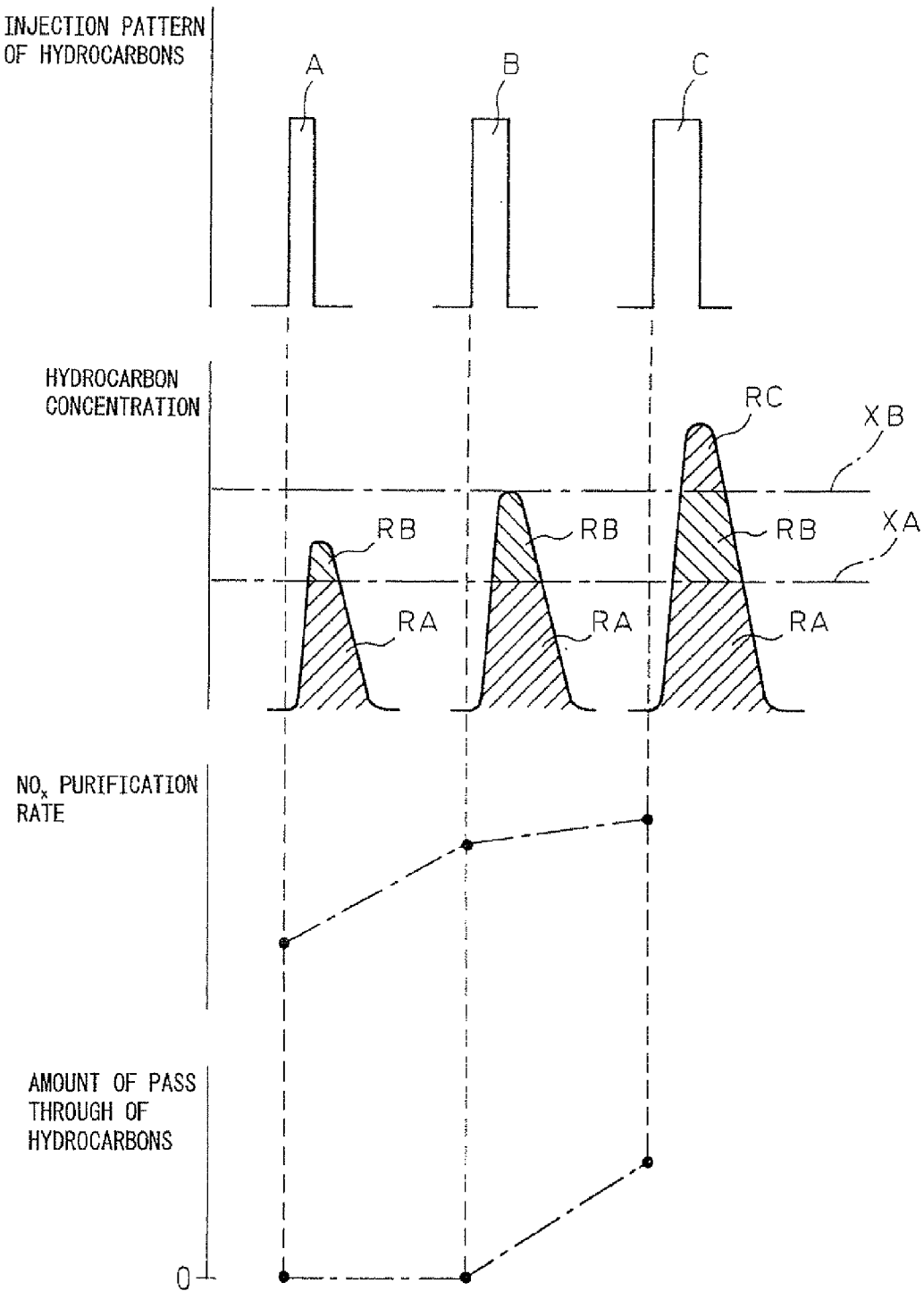
FIG. 20 is a view showing injection patterns of hydrocarbons from a hydrocarbon feed valve and changes of a hydrogen concentration in the exhaust gas flowing into the exhaust purification catalyst etc.

FIG. 20 shows the three injection patterns A, B, and C of hydrocarbons which are injected by different injection times from the hydrocarbon feed valve 16 under the same injection pressure. In this case, the injection time is the shortest in the injection pattern A and is longest in the injection pattern C. Further, FIG. 20 shows a change in the hydrogen concentration with a lapse of time in the exhaust gas which flows into the exhaust purification catalyst 13 after injection by the injection patterns A, B, and C. Furthermore, FIG. 20 shows the $NO_x$ purification rate and pass through amount of hydrocarbons of the exhaust purification catalyst 13 at the time of injection by the injection patterns A, B, and C.

Now, when the hydrogen concentration in the exhaust gas which flows into the exhaust purification catalyst 13, that is, the amount of hydrocarbons per unit amount of exhaust gas, is small, the hydrocarbons end up being completely oxidized at the exhaust purification catalyst 13. On the other hand, if the hydrogen concentration in the exhaust gas, that is, the amount of hydrocarbons per unit amount of exhaust gas, increases, in the exhaust purification catalyst 13, all of the hydrocarbons can no longer be completely oxidized. At this time, part of the hydrocarbons is partially oxidized. In this way, in the hydrogen concentration in the exhaust gas, there is a limit up to where all of the hydrocarbons are completely oxidized in the exhaust purification catalyst 13. This limit is shown in FIG. 20 by XA.

That is, in FIG. 20, when the hydrocarbon concentration is lower than the limit XA, all of the hydrocarbons is completely oxidized, so in FIG. 20, in the hatching region RA below the limit XA, all of the hydrocarbons is completely oxidized. In this case, the area of the hatching region RA expresses the amount of hydrocarbons. Therefore, the amount of hydrocarbons corresponding to the hatching region RA is completely oxidized. Note that, below, this limit XA will be referred to as the complete oxidation limit.

On the other hand, in FIG. 20, in the region RB above the complete oxidation limit XA, a partial oxidation action of hydrocarbons is performed in the exhaust purification catalyst 13. In this case, in FIG. 20, the hatching region RB expresses the amount of partially oxidized hydrocarbons. The reducing intermediate is produced from the partially oxidized hydrocarbons, so the $NO_x$ purification action is performed by the first $NO_x$ purification method by the partially oxidized hydrocarbon. Note that, in actuality, part of the partially oxidized hydrocarbons ends up being oxidized without being used for production of the reducing intermediate, while the remaining partially oxidized hydrocarbons are used to form the reducing intermediate.

On the other hand, if the hydrogen concentration in the exhaust gas which flows into the exhaust purification catalyst 13, that is, the amount of hydrocarbons per unit amount of exhaust gas, is further increased, part of the hydrocarbons is not completely oxidized in the exhaust purification catalyst 13 and further is not even partially oxidized. In this case, the part of the hydrocarbons not oxidized passes straight through the exhaust purification catalyst 13. This limit of hydrocarbons causing hydrocarbons to pass straight through is shown in FIG. 20 by XB. Below, this limit XB will be referred to as the pass through limit. In FIG. 20, the hatching region RC above this pass through limit XB expresses the amount of hydrocarbons passing straight through.

To remove $NO_x$ which is contained in exhaust gas using the first $NO_x$ purification method, it is necessary that a sufficient amount of hydrocarbons for the amount of $NO_x$ which is contained in the exhaust gas be partially oxidized. If the amount of partially oxidized hydrocarbons RB is insufficient, the $NO_x$ purification rate will fall. In FIG. 20, the injection pattern A shows the case where, in this way, the amount of partially oxidized hydrocarbons RB is insufficient. In this case, as shown in FIG. 20, the $NO_x$ purification rate will fall.

On the other hand, in FIG. 20, the injection pattern B shows the case where the injection time is made longer than in the injection pattern A so as to increase the amount of partially oxidized hydrocarbons RB. If the injection time is made longer, the amount of partially oxidized hydrocarbons RB is increased, so, as shown in FIG. 20, the $NO_x$ purification rate becomes higher. Note that, FIG. 20 shows the case where even with the injection pattern B, the amount of partially oxidized hydrocarbons RB is somewhat insufficient.

In FIG. 20, the injection pattern C shows the case where to further increase the amount of partially oxidized hydrocarbons RB, the injection time is made longer compared with the injection pattern B. In this case, as shown in FIG. 20, the $NO_x$ purification rate is improved. However, in this case, the hydrocarbon concentration exceeds the pass through limit XB, so the hydrocarbons pass straight through.

When performing the $NO_x$ purification action by the first $NO_x$ purification method, normally, it is necessary to prevent pass through of the hydrocarbons. Therefore, in the present invention, when performing the $NO_x$ purification action by the first $NO_x$ purification method, normally, in the example shown in FIG. 20, the injection pattern B by which the peak of the hydrocarbon concentration becomes the pass through limit XB is used. Of course, as shown in the injection pattern A, the injection pattern A is used when a sufficiently high $NO_x$ purification rate is obtained even if the peak of the hydrocarbon concentration does not reach the pass through limit XB. That is, in the present invention, then performing the $NO_x$ purification action by the first $NO_x$ purification method, normally the injection pattern A or the injection pattern B is used.

Now, if the temperature of the exhaust purification catalyst 13 rises, the amount of hydrocarbons which is oxidized at the exhaust purification catalyst 13 per unit time increases, that is, the oxidation speed at the hydrocarbons increases. As a result, if the temperature of the exhaust purification catalyst 13 rises, the complete oxidation limit XA rises. On the other hand, if the temperature of the exhaust purification catalyst 13 rises, the hydrocarbons which passed through before the temperature rose become partially oxidized, so the pass through limit XB also rises. That is, if the temperature of the exhaust purification catalyst 13 rises, both the complete oxidation limit XA and the pass through limit XB rise. Therefore, when using the first $NO_x$ purification method for removal of the $NO_x$, it is necessary to consider this for control of injection of the hydrocarbons.

Figure 21:
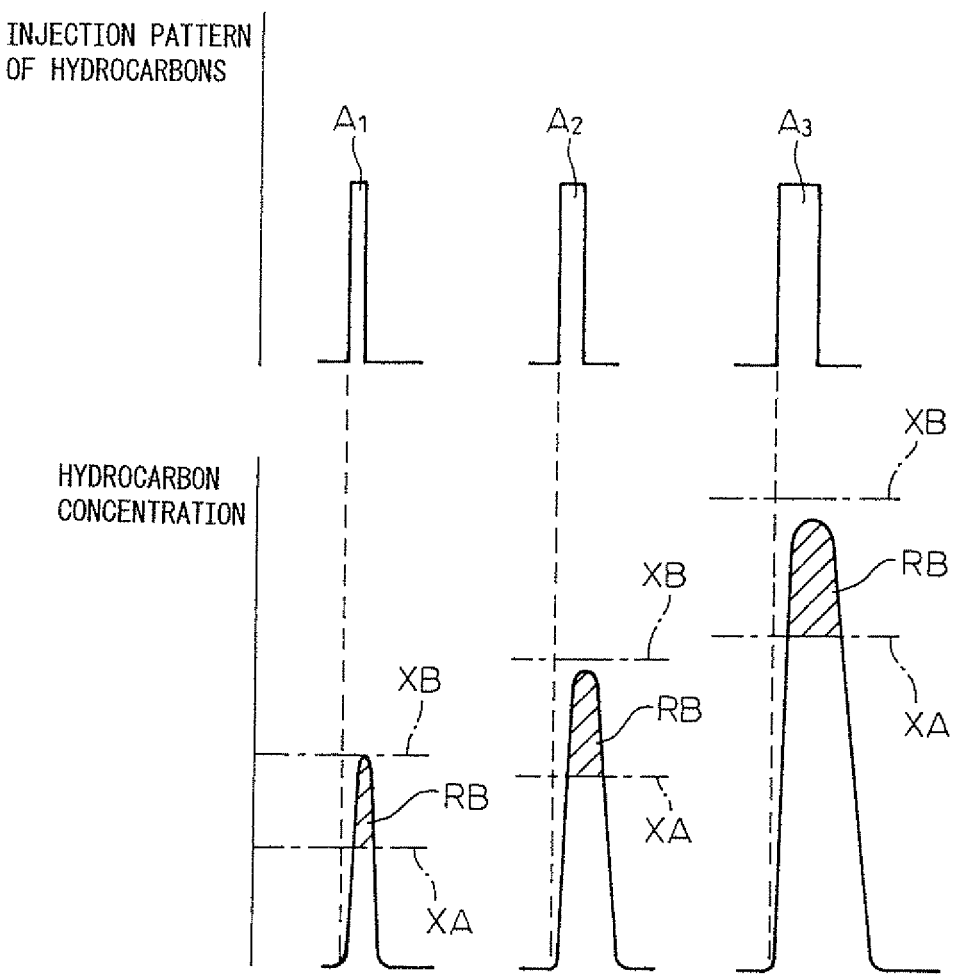
FIG. 21 is a view showing injection patterns of hydrocarbons from a hydrocarbon feed valve and changes of a hydrogen concentration in the exhaust gas flowing into the exhaust purification catalyst etc.
Figure 22:
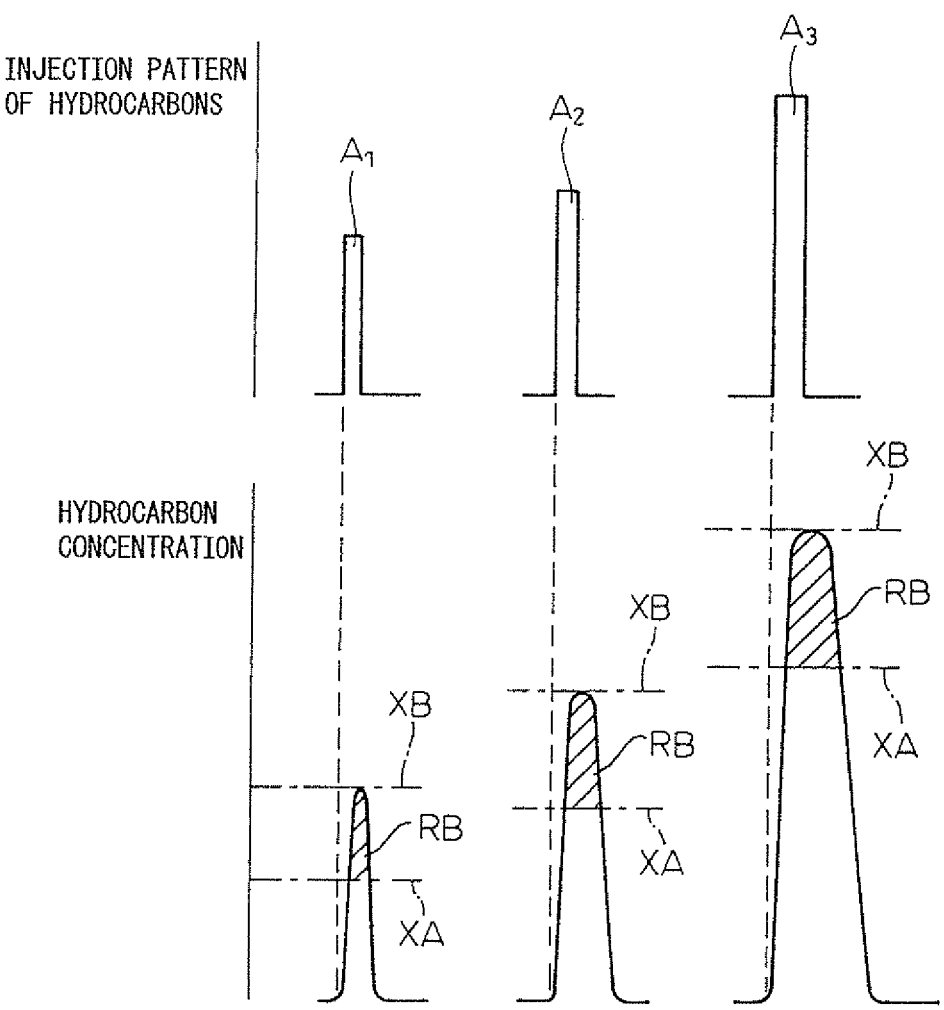
FIG. 22 is a view showing injection patterns of hydrocarbons from a hydrocarbon feed valve and changes of a hydrogen concentration in the exhaust gas flowing into the exhaust purification catalyst etc.

FIG. 21 and FIG. 22 show an example when considering this in controlling injection of hydrocarbons. Note that, in the example shown in FIG. 21, the case is shown of controlling the injection time so as to control the injection amount of hydrocarbons in the state where the injection pressure is maintained constant, while in the example shown in FIG. 22, the case is shown of controlling both the injection pressure and injection time so as to control the injection amount of hydrocarbons.

Further, in FIG. 21 and FIG. 22, $A_1$ shows the injection pattern when the engine speed and load are relatively low, $A_3$ shows the injection pattern when the engine speed and load are relatively high, and $A_2$ shows the injection pattern when the engine speed and load are respectively between the case shown by $A_1$ and the case shown by $A_3$. That is, as the engine speed and load become higher, the injection pattern is made to change from $A_1$ toward $A_3$.

Now, the higher the engine speed and load, the higher the temperature of the exhaust purification catalyst 13 becomes. Therefore, the higher the engine speed and load, the higher the complete oxidation limit XA and pass through limit XB as well. On the other hand, the higher the speed and load, the greater the $NO_x$ exhausted from the engine per unit time. Therefore, the higher the engine speed and load, the greater the amount RB of partially oxidized hydrocarbons has to be made. In this case, to make the amount RB of partially oxidized hydrocarbons increase, the injection amount of hydrocarbons has to be increased. Therefore, to enable the production of the amount of partially oxidized hydrocarbons required for removal of $NO_x$, in the example shown in FIG. 21, the higher the engine speed and load, the longer the injection time is made so as to make the injection amount increase, while in the example shown in FIG. 22, the higher the engine speed and load, the longer both the injection pressure and injection time are made so as to make the injection amount increase.

In this way, the injection amount can be controlled by controlling just the injection time or by controlling both the injection pressure and injection time, but below the case of controlling just the injection time so as to control the injection amount will be used as an example to explain the present invention.

Figure 23A:
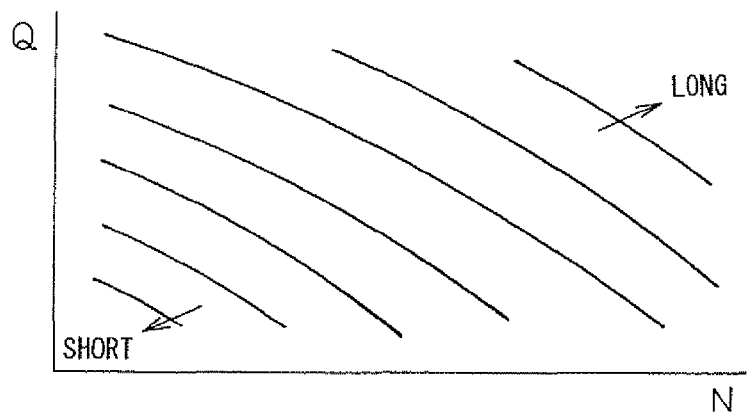
FIGS. 23A to 23C are views showing the injection time of hydrocarbons etc.
Figure 23B:
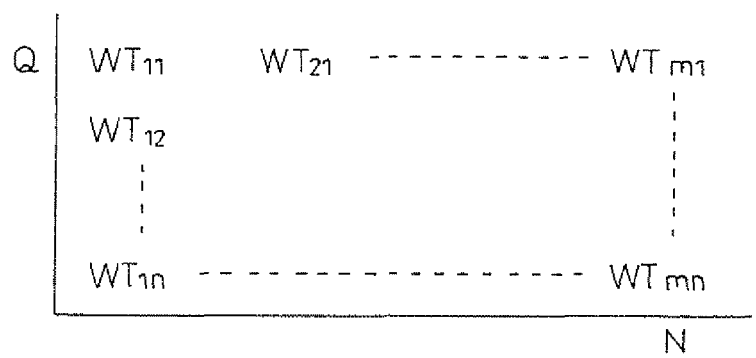

FIG. 23A shows the equivalent injection time lines enabling the production of the amount of partially oxidized hydrocarbons required for removal of $NO_x$ when controlling just the injection time to control the injection amount in this way. As will be understood from FIG. 23A, the injection time of hydrocarbons becomes longer the greater fuel injection amount Q to the inside of the combustion chamber 2, that is, the greater the engine load, and the higher the engine speed N. This injection time WT is stored as a function of the fuel injection amount Q and engine speed N in the form of a map as shown in FIG. 23B in advance in the ROM 32. Further, the optimum vibration amplitude $\Delta T$ of the hydrocarbon concentration, that is, the injection period $\Delta T$ of the hydrocarbons, is similarly stored as a function of the injection amount Q and engine speed N in the form of a map as shown in FIG. 23C in advance in the ROM 32.

Figure 23C:
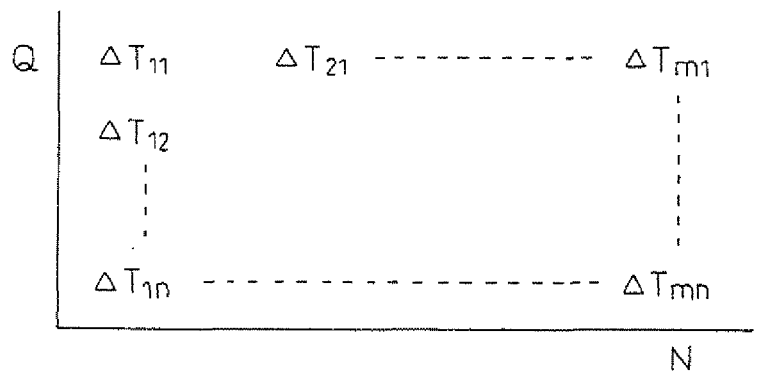
Figure 24:
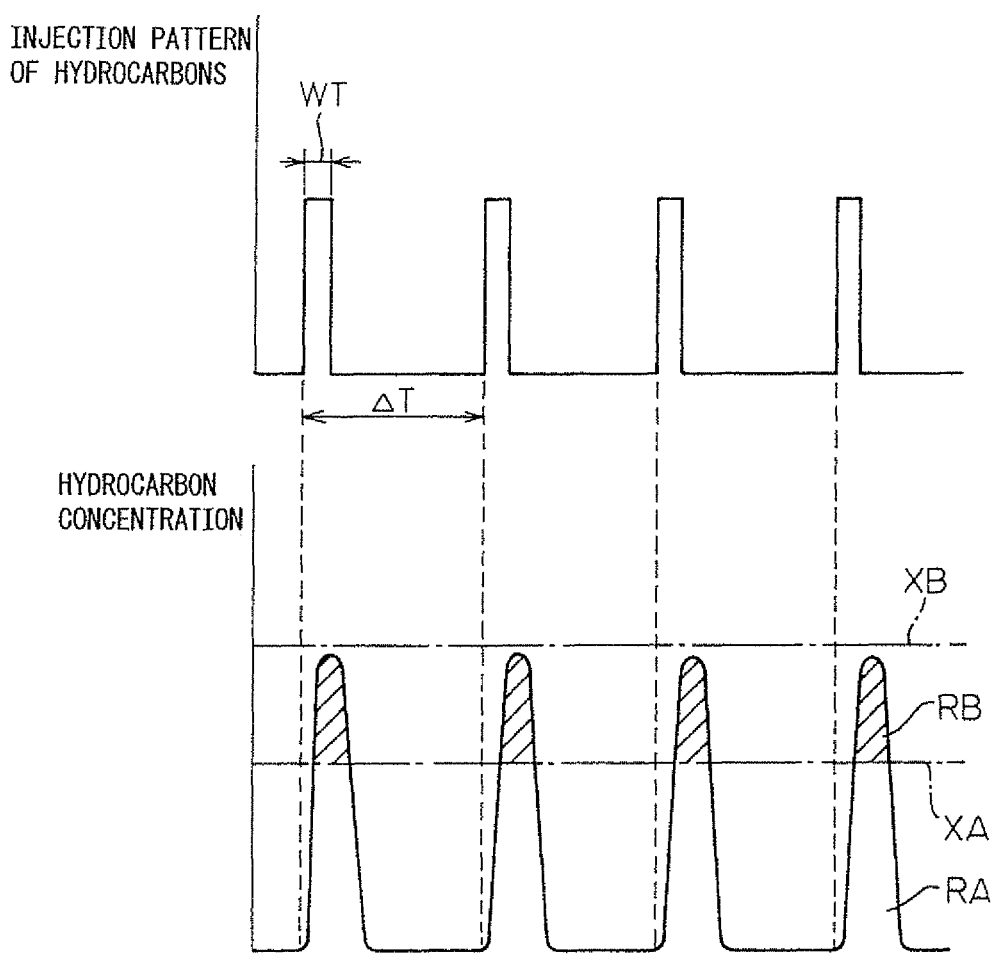
FIG. 24 is a view showing injection patterns of hydrocarbons from a hydrocarbon feed valve and changes of a hydrogen concentration in the exhaust gas flowing into the exhaust purification catalyst etc.

At the time of engine operation, if hydrocarbons are injected from a hydrocarbon feed valve 16 by the injection time WTij shown in FIG. 23B and the injection period $\Delta$Tij shown in FIG. 23C, a good $NO_x$ purification action by the first $NO_x$ purification method is performed. FIG. 24 shows the injection pattern of hydrocarbons at the time when a good $NO_x$ purification action by the first $NO_x$ purification method is performed in this way and the change in the hydrocarbon concentration. At this time, the amount of hydrocarbons shown in the region RA in FIG. 24 is made to completely oxidize. At this time, due to the heat of oxidation reaction of the hydrocarbons, the exhaust purification catalyst 13 is maintained in the activated state.

In this regard, in this way, even when a good $NO_x$ purification action is being performed by the $NO_x$ purification method, the NO which could not be removed, through small in amount, is exhausted from the exhaust purification catalyst 13. In this case, in the embodiment shown in FIG. 1, the particulate filter 14 is arranged downstream of the exhaust purification catalyst 13. Therefore, the NO which is exhausted from the exhaust purification catalyst 13 flows into the particulate filter 14. On the other hand, the particulate filter 14 carries on it a precious metal catalyst such as platinum Pt. Therefore, the particulate filter 14 has an oxidation function. As a result, the NO which flows into the particulate filter 14 is converted to $NO_2$ inside of the particulate filter 14. Therefore, $NO_2$ flows out from the particulate filter 14. Next, this $NO_2$ flows into the $NO_2$ selective catalyst 15.

In this regard, in $NO_x$, $NO_2$ is particularly problematic from the viewpoint of air pollution. Therefore, $NO_2$ has to be kept from being exhausted to the atmosphere as much as possible. In this regard, if there are hydrocarbons around this $NO_2$, the $NO_2$ can be easily reduced to NO on an oxidation catalyst, reduction catalyst, or other catalyst ($2HC + 5NO_2 \rightarrow 2CO_2 + 5NO + H_2O$). That is, if there are hydrocarbons around this $NO_2$, the $NO_2$ can be easily reduced to NO on the $NO_2$ reduction catalyst 15.

On the other hand, as explained before, when the $NO_x$ purification action by the first $NO_x$ purification method is being performed, normally, as will be understood from FIG. 24, the injection amount of hydrocarbons is controlled so that hydrocarbons do not pass straight through the exhaust purification catalyst 13. Therefore, in the present invention, when the $NO_2$ which is contained in the exhaust gas should be reduced to NO, as shown in FIG. 25, the amplitude of change of the concentration of hydrocarbons is made to increase to make the pass through amount RC of the hydrocarbons which pass straight through the exhaust purification catalyst 13 increase and thereby reduce the $NO_2$ to NO on the $NO_2$ reduction catalyst 15 by the hydrocarbons which pass through.

That is, expressing this in general, in the present invention, an $NO_2$ reduction catalyst 15 which can reduce the $NO_2$ contained in exhaust gas to NO when hydrocarbons are fed is arranged inside of the engine exhaust passage downstream of the exhaust purification catalyst 13, and when the $NO_2$ contained in exhaust gas should be reduced to NO, the amplitude of the change of the concentration of hydrocarbons flowing into the exhaust purification catalyst 13 is increased to increase the pass through amount RC of hydrocarbons which pass through the exhaust purification catalyst 13.

Figure 25:
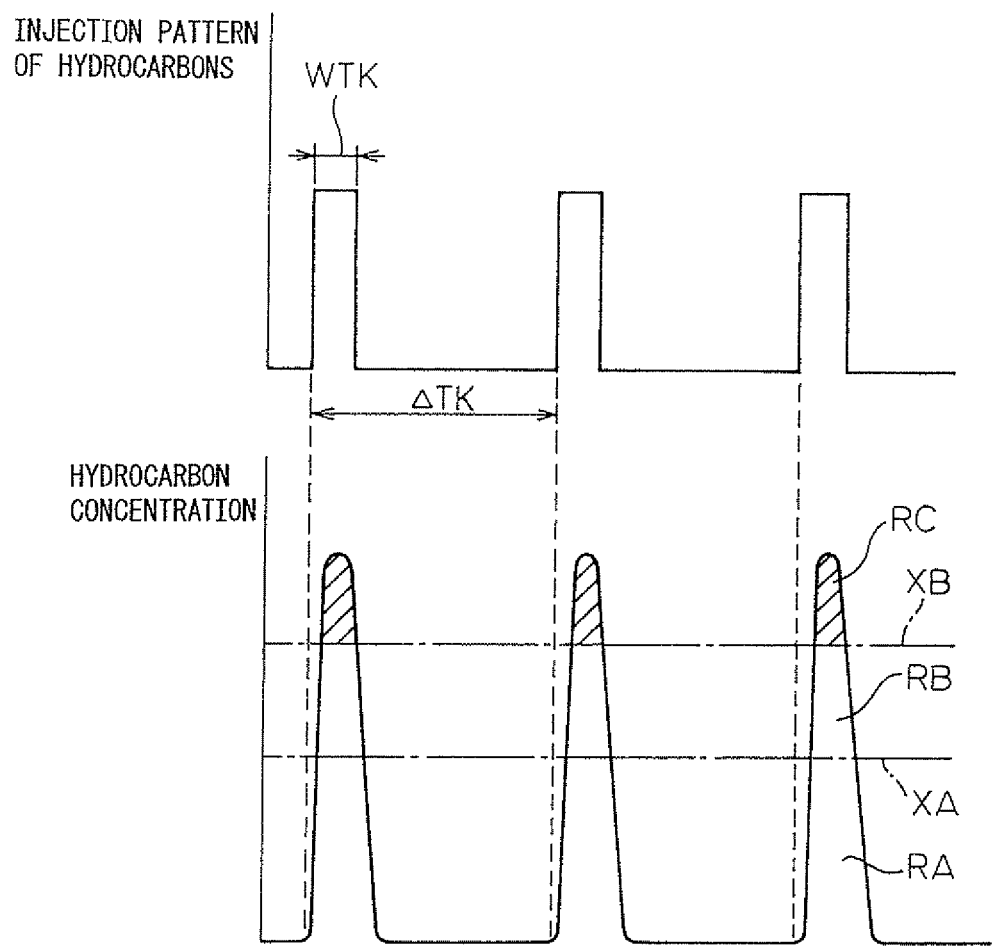
FIG. 25 is a view showing injection patterns of hydrocarbons from a hydrocarbon feed valve and changes of a hydrogen concentration in the exhaust gas flowing into the exhaust purification catalyst etc.

In this case, in this embodiment of the present invention, as shown in FIG. 25 by WTK, the injection time is made longer than the injection time TW when the $NO_x$ purification action by the first $NO_x$ purification method is being performed (FIG. 24), whereby the injection amount is increased to increase the pass through amount RC of the hydrocarbons.

In this way, if the injection amount is increased, as clear from a comparison with FIG. 24, the amount RB of partially oxidized hydrocarbons also increases, therefore, at this time, a sufficient amount of the reducing intermediate is produced. Therefore, at this time, a good $NO_x$ purification action by the first $NO_x$ purification method is performed.

Note that, if the injection amount is increased, the amount RA of hydrocarbons which is completely oxidized at the exhaust purification catalyst 13 is increased, so the heat of oxidation reaction is increased and, as a result, the temperature of the exhaust purification catalyst 13 rises. However, at this time, the exhaust purification catalyst 13 itself does not particularly have to be raised in temperature. The temperature of the exhaust purification catalyst 13 need only be maintained at the temperature at that time. In this case, to maintain the temperature of the exhaust purification catalyst 13 as it is, it is necessary to maintain the amount of hydrocarbons which is completely oxidized per unit time constant.

The amount of hydrocarbons which is completely oxidized per unit time can be expressed by the value (RA/$\Delta$TK) of the amount RA of completely oxidized hydrocarbons per injection divided by the injection period $\Delta$TK. In this case, the amount RA of completely oxidized hydrocarbons per injection is proportional to the injection amount, while the injection amount is proportional to the injection time WTK, so the amount of hydrocarbons completely oxidized per unit time can be expressed by the value (WTK/$\Delta$TK) of the injection time WTK divided by the injection period $\Delta$TK. Therefore, to maintain the temperature of the exhaust purification catalyst 13 as it is, it is sufficient to make this value (WTK/$\Delta$TK) equal to the (WT/$\Delta$T) of the case shown in FIG. 24.

Figure 26:
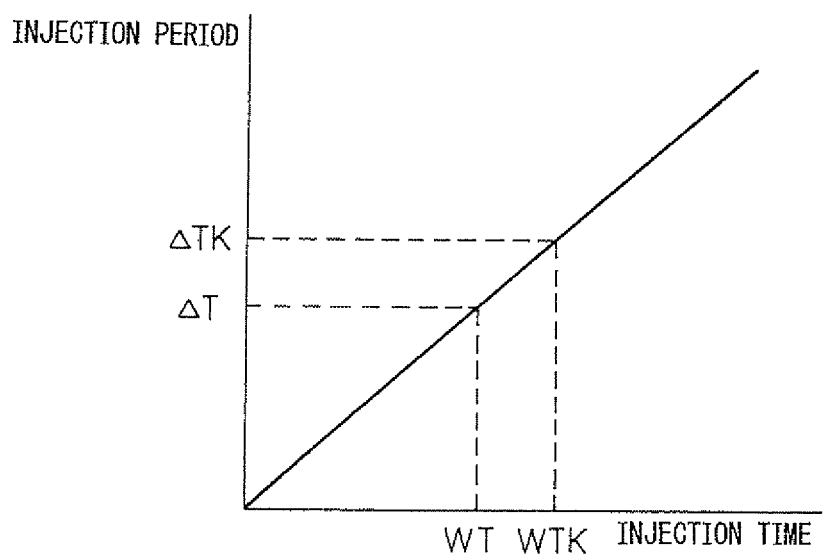
FIG. 26 is a view showing a relationship between an injection time and injection period of hydrocarbons.

The relationship when (WTK/$\Delta$TK)=(WT/$\Delta$T) is shown in FIG. 26. As will be understood from FIG. 26, to maintain the temperature of the exhaust purification catalyst 13 as it is, it is necessary to increase the injection period from $\Delta$T to $\Delta$TK when the injection time is increased from WT to WTK. That is, in this embodiment according to the present invention, when the $NO_2$ which is contained in the exhaust gas should be reduced to NO, the injection amount of hydrocarbons from the hydrocarbon feed valve 16 is increased so as to make the amplitude of the change of the concentration of hydrocarbons flowing into the exhaust purification catalyst 13 increase. At this time, the injection period of the hydrocarbons is made longer the more the injection amount of hydrocarbons increases.

Now, in the embodiment shown in FIG. 1, the particulate filter 14 is arranged inside of the engine exhaust passage between the exhaust purification catalyst 13 and the $NO_2$ reduction catalyst 15, and as explained before, this particulate filter 14 has an $NO_2$ producing ability. Therefore, in this embodiment, when the $NO_2$ which is produced at the particulate filter 14 should be reduced to NO, the pass through amount of hydrocarbons which pass straight through the exhaust purification catalyst 13 is made to increase.

In this case, specifically speaking, in the embodiment shown in FIG. 1, when the amount of production of $NO_2$ on the particulate filter 14 exceeds a predetermined allowable amount, the pass through amount of the hydrocarbons which pass straight through the exhaust purification catalyst 13 is made to increase to reduce the $NO_2$ produced at the particulate filter 14 to NO. This will be explained with reference to FIGS. 27A to 27C.

Figure 27A:
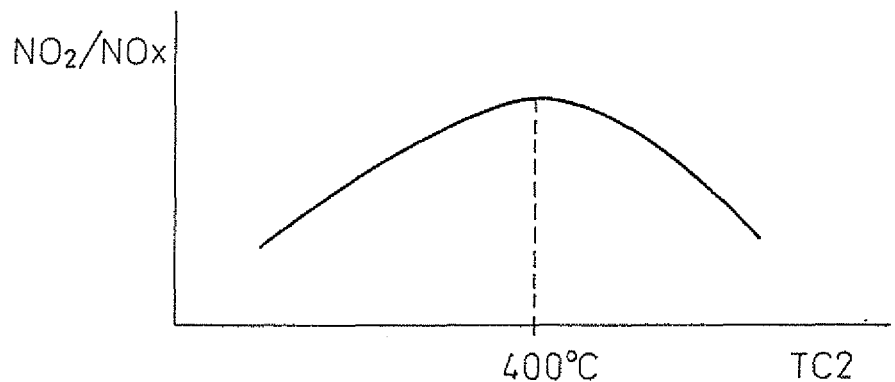
FIGS. 27A to 27C are views showing a region where the pass through amount of hydrocarbons should be increased.

FIG. 27A shows the relationship between the exhausted $NO_2$ ratio ($NO_2/NO_x$) showing the amount of exhausted $NO_2$ with respect to the total amount of $NO_x$ exhausted from the particulate filter 14 and the temperature TC2 of the particulate filter 14. The oxidation rate of the NO oxidation reaction on the particulate filter 14 ($NO+\frac{1}{2}O_2 \to NO_2$) increases as the particulate filter 14 becomes higher in temperature, but this oxidation reaction reaches equilibrium at about 400° C. If the temperature TC2 of the particulate filter 14 exceeds 400° C., the oxidation speed will drop. Therefore, as shown in FIG. 27A, when the temperature TC2 of the particulate filter 14 is about 400° C., the amount of $NO_2$ exhausted from the particulate filter 14 peaks.

Figure 27B:
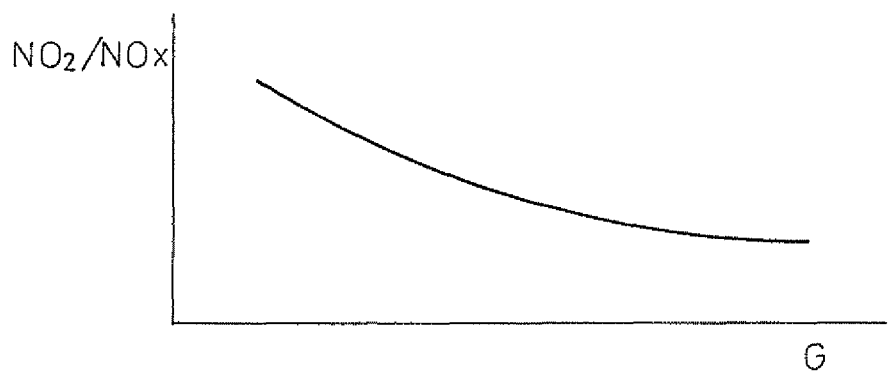

On the other hand, FIG. 27B shows the relationship between the exhausted $NO_2$ ratio ($NO_2/NO_x$) showing the amount of exhausted $NO_2$ with respect to the total amount of $NO_x$ exhausted from the particulate filter 14 and the particulate buildup G on the particulate filter 14. On the particulate filter 14, the particulate, that is, carbon C, acts as a reducing agent with respect to the $NO_2$ ($C+2NO_2 \to CO_2+2NO$), so, as shown in FIG. 27B, the more the particulate buildup G increases, the more the amount of exhausted $NO_2$ is decreased.

Figure 27C:
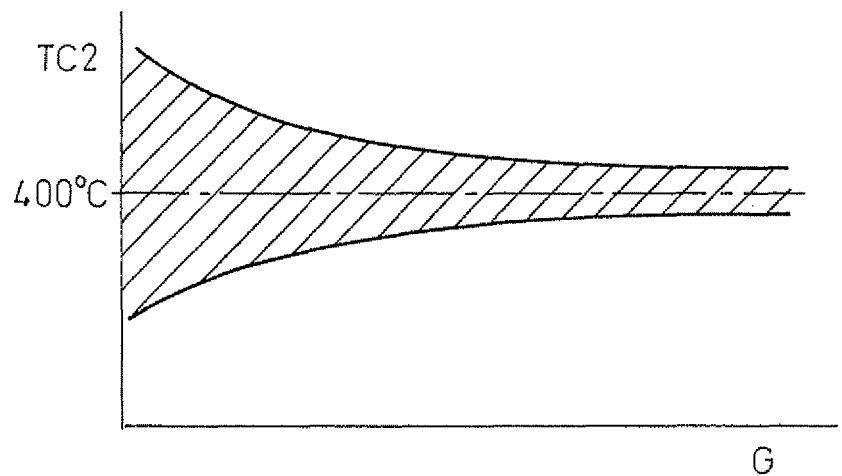

As will be understood from FIGS. 27A and 27B, the amount of production of $NO_2$ on the particulate filter 14 becomes a function of the particulate buildup G on the particulate filter 14 and the temperature TC2 of the particulate filter 14. The hatching in FIG. 27C shows the region where the amount of production of $NO_2$ on the particulate filter 14 exceeds the predetermined allowable amount. This region is determined from the particulate buildup G and the temperature TC2 of the particulate filter 14. In this embodiment according to the present invention, when the particulate buildup G and the temperature TC2 of the particulate filter 14 are in this region, the feed amount of hydrocarbons for reducing $NO_2$ to $NO_x$ is increased. Therefore, in this embodiment according to the present invention, this region is called the increase region.

That is, in this embodiment according to the present invention, in other words, the relationship between the particulate buildup G and the temperature TC2 of the particulate filter 14 at the time when the amount of production of $NO_2$ on the particulate filter 14 exceeds a predetermined allowable amount is stored in advance. When it is judged from the particulate buildup G and the temperature TC2 of the particulate filter 14, based on this stored relationship, that the amount of production of $NO_2$ on the particulate filter 14 exceeds a predetermined allowable amount, the pass through amount of hydrocarbons which pass straight through the exhaust purification catalyst 13 is made to increase to reduce the $NO_2$ which is produced on the particulate filter 14 to NO.

Note that, even if the amount of production of $NO_2$ on the particulate filter 14 exceeds a predetermined allowable amount, if making the pass through amount of hydrocarbons increase when the $NO_2$ reduction catalyst 15 is not activated, the hydrocarbons will end up being released into the atmosphere as they are. Therefore, in this embodiment according to the present invention, even when the amount of production of $NO_2$ on the particulate filter 14 exceeds a predetermined allowable amount, when the $NO_2$ reduction catalyst 15 is not activated, the action of increasing the pass through amount of hydrocarbons which pass straight through the exhaust purification catalyst 13 is prohibited.

Figure 28:
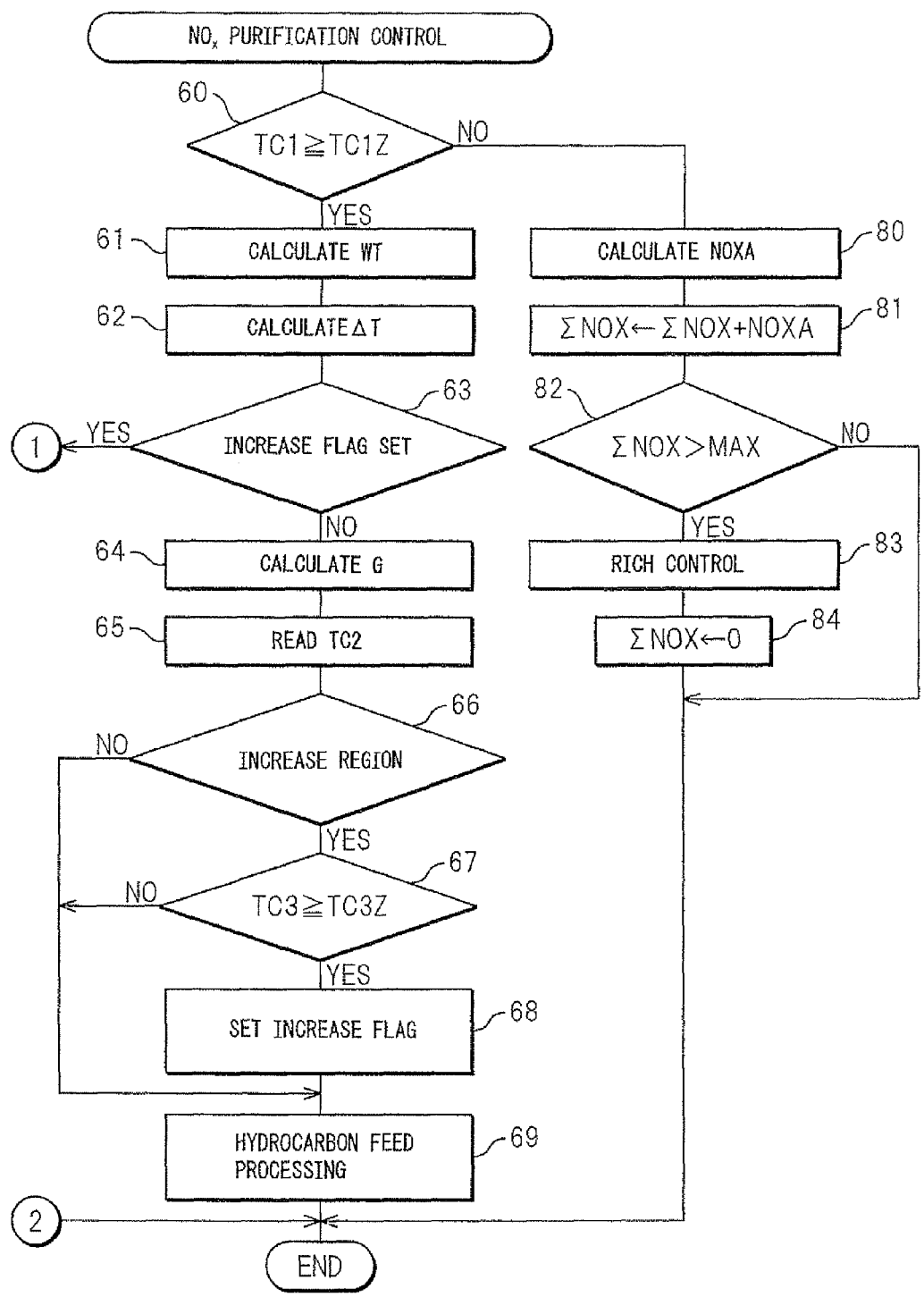
FIG. 28 and FIG. 29 is a flow chart for $NO_x$ purification control.
Figure 29:
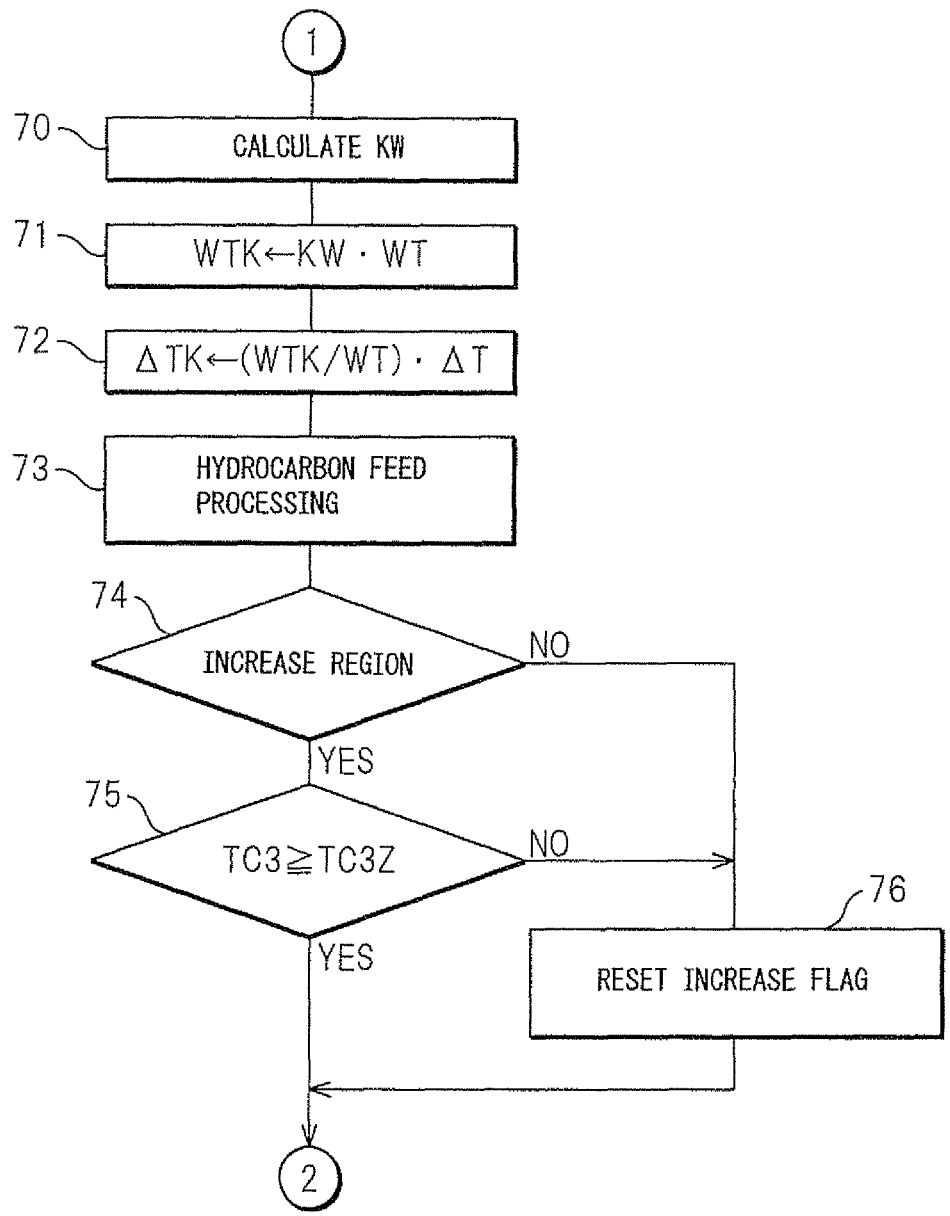

FIGS. 28 and 29 shows the $NO_x$ purification control routine. This routine is executed by interruption every predetermined time.

Referring to FIG. 28, first, at step 60, it is judged from the output signal of the temperature sensor 24 if the temperature TC1 of the exhaust purification catalyst 13 exceeds the activation temperature TC1Z. When TC1$\geq$TC1Z, that is, when the exhaust purification catalyst 13 is activated, the routine proceeds to step 61 where the injection time WT in accordance with the operating state is calculated from the map shown in FIG. 23B. Next, at step 62, the injection period $\Delta$T in accordance with the operating state is calculated from the map shown in FIG. 23C.

Next, at step 63, it is judged if an increase flag showing that the pass through amount of the hydrocarbons should be increased is set. When the increase flag is not set, the routine proceeds to step 64 where the output signal of the differential pressure sensor 26 is used as the basis to calculate the particulate buildup G. Next, at step 65, the temperature TC2 of the particulate filter 14 which is detected by the temperature sensor 25 is read.

Next, at step 66, it is judged if the region is the increase region shown in FIG. 27C by hatching. If not the increase region, the routine jumps to step 69 where processing for feeding hydrocarbons is performed by the injection time WT which was calculated at step 61 and the injection period $\Delta$T which was calculated at step 62. At this time, the $NO_x$ purification action by the first $NO_x$ purification method is executed. Next, the processing cycle is ended.

As opposed to this, when it is judged at step 66 that the region is the increase region, the routine proceeds to step 67 where it is judged based on the output signal of the temperature sensor 27 if the temperature TC3 of the $NO_2$ reduction catalyst 15 is higher than the activation temperature TC3Z. When the temperature TC3 of the $NO_2$ reduction catalyst 15 is higher than the activation temperature TC3Z, that is, when the $NO_2$ reduction catalyst 15 is activated, the routine proceeds to step 68 where the increase flag is set. As opposed to this, when it is judged at step 67 that the temperature TC3 of the $NO_2$ reduction catalyst 15 is lower than the activation temperature TC3Z, that is, when the $NO_2$ reduction catalyst 15 is not activated, the routine jumps to step 69 without the increase flag being set.

If the increase flag is set, the routine proceeds from step 63 to step 70 where the action of increasing the pass through amount of hydrocarbons is started. That is, first, at step 70, the increase coefficient KW of hydrocarbons is calculated. This increase coefficient KW is a value larger than 1.0 and is stored in advance in accordance with the engine operating state. Next, at step 71, the injection time WT which was calculated at step 61 is multiplied with this increase coefficient KW to calculate the injection time WTK (=KW·WT) of hydrocarbons at the time of increase. Next, at step 72, the following formula is used as the basis to calculate the injection period ΔTK of hydrocarbons at the time of increase.

$$\Delta TK \leftarrow (WTK/WT) \cdot \Delta T$$

As will be understood from the above formula, the injection period ΔTK at the time of increase, is made longer the more the injection time WTK is increased. Next, at step 73, the processing for feed of hydrocarbons is performed by the injection time WTK which was calculated at step 71 and the injection period ΔTK which was calculated at step 72. At this time, the $NO_x$ purification action by the first $NO_x$ purification method is executed while the reduction processing for reducing the $NO_2$ to NO is performed.

Next, at step 74, it is judged if the region is the increase region shown in FIG. 27C by hatching. When it is judged to be the increase region, the routine proceeds to step 75 where it is judged based on the output signal of the temperature sensor 27 if the temperature TC3 of the $NO_2$ reduction catalyst 15 is higher than the activation temperature TC3Z. When the temperature TC3 of the $NO_2$ reduction catalyst 15 is higher than the activation temperature TC3Z, that is, when the $NO_2$ reduction catalyst 15 is activated, the processing cycle is ended.

As opposed to this, when it is judged at step 74 that the region is not the increase region or when it is judged at step 75 that the temperature TC3 of the $NO_2$ reduction catalyst 15 is lower than the activation temperature TC3Z, the routine proceeds to step 76 where the increase flag is reset. If the increase flag is reset, the increase action is stopped.

On the other hand, when it is judged at step 60 that TC1<TC1Z, it is judged that the second $NO_x$ purification method should be used, then the routine proceeds to step 80. At step 80, the $NO_x$ amount NOXA of $NO_x$ which is exhausted per unit time is calculated from the map shown in FIG. 17. Next, at step 81, ΣNOX is increased by the exhausted $NO_x$ amount NOXA to calculate the stored $NO_x$ amount ΣNOX. Next, at step 82, it is judged if the stored $NO_x$ amount ΣNOX exceeds the allowable value MAX. When ΣNOX>MAX, the routine proceeds to step 83 where the additional fuel amount WR is calculated from the map shown in FIG. 19 and the injection action of additional fuel is performed. Next, at step 84, ΣNOX is cleared.

Figure 30:
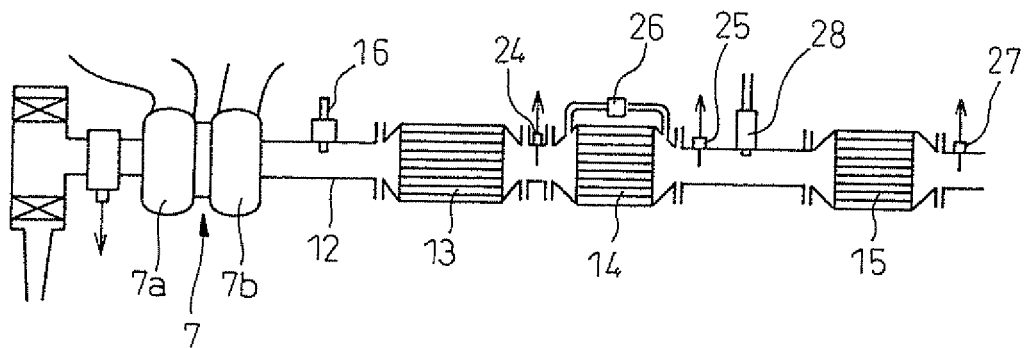
FIG. 30 is a view showing another embodiment.

FIG. 30 shows another embodiment. In this embodiment, as the $NO_2$ reduction catalyst 15, the case of use of the $NO_x$ selective reduction catalyst is shown. In this case, as shown in FIG. 30, upstream of the $NO_2$ reduction catalyst 15, an aqueous urea solution feed valve 28 is arranged. From the aqueous urea solution feed valve 28, an aqueous urea solution is fed into the exhaust gas. The $NO_x$ which is contained in the exhaust gas is reduced by the ammonia which is produced from the aqueous urea solution as well at the $NO_x$ selective reduction catalyst.

In this embodiment as well, when the $NO_2$ which is contained in the exhaust gas should be reduced to NO, the amplitude of the change of the concentration of hydrocarbons flowing into the exhaust purification catalyst 13 is increased to make the pass through amount of hydrocarbons which pass straight through the exhaust purification catalyst 13 increase. This $NO_x$ selective reduction catalyst 15 has a hydrocarbon adsorption function. Therefore, in this embodiment, the hydrocarbons which pass straight through the exhaust purification catalyst 13 are adsorbed once at the $NO_x$ selective reduction catalyst 15. The $NO_2$ which is contained in the exhaust gas is reduced to NO by the hydrocarbons which are adsorbed at the $NO_x$ selective reduction catalyst 15.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . $NO_2$ reduction catalyst
16 . . . hydrocarbon feed valve

The invention claimed is:

1. An exhaust purification system of an internal combustion engine comprising:
   an engine exhaust passage;
   a hydrocarbon feed valve for feeding hydrocarbons arranged inside of the engine exhaust passage;
   an exhaust purification catalyst for reacting $NO_x$ contained in exhaust gas and reformed hydrocarbons arranged inside of the engine exhaust passage downstream of the hydrocarbon feed valve;
   a precious metal catalyst carried on an exhaust gas flow surface of the exhaust purification catalyst;
   a basic exhaust gas flow surface part formed around the precious metal catalyst;
   an $NO_2$ reduction catalyst that is able to reduce $NO_2$ that is contained in exhaust gas to NO when hydrocarbons are fed to the $NO_2$ reduction catalyst arranged inside of the engine exhaust passage downstream of the exhaust purification catalyst; and
   an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
      when the electronic control unit controls the vibration of the concentration of hydrocarbons flowing into the exhaust purification catalyst within the predetermined range of amplitude and within the predetermined range of period, a reducing intermediate containing nitrogen and hydrocarbons is produced on the precious metal catalyst and held on the basic exhaust gas flow surface part, the $NO_x$ contained in the exhaust gas catalyst is chemically reduced by a reducing action of the reducing intermediate held on the basic exhaust gas flow surface part in the exhaust purification catalyst, and the exhaust purification catalyst has a property of chemically reducing the $NO_x$ is contained in the exhaust gas without storing, or storing a fine amount of nitrates in the basic exhaust gas flow surface part, when the electronic control unit controls the vibration period of the hydrocarbon concentration longer than the predetermined range of period, the exhaust purification catalyst has a property of being increased in storage amount of $NO_x$ that is contained in exhaust gas, the electronic control unit is configured to control, when needed, an injection amount of hydrocarbons from the hydrocarbon feed valve so that an amplitude of a change of concentration of hydrocarbons flowing into the exhaust purification catalyst becomes within the predetermined range of amplitude, and is configured to control, when needed, an injection period of hydrocarbons from the hydrocarbon feed valve so that the concentration of hydrocarbons flowing into the exhaust purification catalyst vibrates within the predetermined range of period, and the electronic control unit is further configured to determine when the $NO_2$ that is contained in the exhaust gas should be reduced to NO, and when the electronic control unit determines that the $NO_2$ that is contained in the exhaust gas should be reduced to NO, the electronic control unit is configured to control an amplitude of a change of the concentration of hydrocarbons flowing into the exhaust purification catalyst to cause an increase in a pass through amount of hydrocarbons that pass through the exhaust purification catalyst without being oxidized.

2. The exhaust purification system of an internal combustion engine as claimed in claim 1, further comprising:
a particulate filter arranged inside of the engine exhaust passage between the exhaust purification catalyst and the $NO_2$ reduction catalyst, wherein
the particulate filter has an $NO_2$ producing ability, and
the electronic control unit is configured to determine when the $NO_2$ that is produced on the particulate filter should be reduced to NO, and when the electronic control unit determines that the $NO_2$ that is produced on the particulate filter should be reduced to NO, the electronic control unit is configured to cause the pass through amount of hydrocarbons that pass through the exhaust purification catalyst without being oxidized to increase.

3. The exhaust purification system of an internal combustion engine as claimed in claim 2, wherein when an amount of production of $NO_2$ on the particulate filter exceeds a predetermined allowable amount, the electronic control unit is configured to cause the pass through amount of hydrocarbons that pass through the exhaust purification catalyst without being oxidized to increase to reduce the $NO_2$ that is produced on the particulate filter to NO.

4. The exhaust purification system of an internal combustion engine as claimed in claim 3, wherein the amount of production of $NO_2$ on the particulate filter is a function of a particulate buildup on the particulate filter and a particulate filter temperature, the electronic control unit is configured to use a relationship between the particulate buildup and the particulate filter temperature to determine when the amount of production of $NO_2$ on the particulate filter exceeds the predetermined allowable amount, and when the electronic control unit determines from the relationship between the particulate buildup and the particulate filter temperature that the amount of production of $NO_2$ on the particulate filter exceeds the predetermined allowable amount, the electronic control unit causes the pass through amount of hydrocarbons that pass through the exhaust purification catalyst without being oxidized to increase to reduce the $NO_2$ that is produced on the particulate filter to NO.

5. The exhaust purification system of an internal combustion engine as claimed in claim 3, wherein when the $NO_2$ reduction catalyst is not activated, the electronic control unit is configured to not cause an increase in the amount of hydrocarbons that pass through the exhaust purification catalyst without being oxidized, even if the amount of production of $NO_2$ on the particulate filter exceeds the predetermined allowable amount.

6. The exhaust purification system of an internal combustion engine as claimed in claim 1, wherein the $NO_2$ reduction catalyst is comprised of any of a reduction catalyst, an oxidation catalyst, and/or a $NO_x$ selective reduction catalyst.

7. The exhaust purification system of an internal combustion engine as claimed in claim 1, wherein when the electronic control unit determines that the $NO_2$ that is contained in exhaust gas should be reduced to NO, the electronic control unit causes an increase in the amplitude of the change of the concentration of hydrocarbons flowing into the exhaust purification catalyst by causing an increase in the injection amount of hydrocarbons from the hydrocarbon feed valve, and wherein, at this time, the injection period of hydrocarbons increases as the injection amount of hydrocarbons increases.

8. The exhaust purification system of an internal combustion engine as claimed in claim 1, wherein the predetermined injection period of the hydrocarbon concentration is a period required for continued production of the reducing intermediate.

9. The exhaust purification system of an internal combustion engine as claimed in claim 8, wherein the predetermined injection period of the hydrocarbons is 0.3 second to 5 seconds.

10. The exhaust purification system of an internal combustion engine as claimed in claim 1, wherein the precious metal catalyst is comprised of platinum (Pt) and at least one of rhodium (Rh) and/or palladium (Pd).

11. The exhaust purification system of an internal combustion engine as claimed in claim 1, wherein a basic layer containing an alkali metal, an alkali earth metal, a rare earth, and/or a metal that can donate electrons to $NO_x$ is formed on the exhaust gas flow surface of the exhaust purification catalyst, and wherein a surface of the basic layer forms the basic exhaust gas flow surface part.

* * * * *